United States Patent
Zhu et al.

(10) Patent No.: US 11,012,825 B2
(45) Date of Patent: May 18, 2021

(54) SHORT MESSAGE TRANSMISSION METHOD, DEVICE, AND SYSTEM

(71) Applicant: HUAWEI TECHNOLOGIES CO., LTD., Shenzhen (CN)

(72) Inventors: Fangyuan Zhu, Beijing (CN); Yan Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/520,370

(22) Filed: Jul. 24, 2019

(65) Prior Publication Data
US 2019/0349721 A1 Nov. 14, 2019

Related U.S. Application Data

(63) Continuation of application No. PCT/CN2017/072509, filed on Jan. 24, 2017.

(51) Int. Cl.
*H04W 4/14* (2009.01)
*H04W 76/11* (2018.01)
(Continued)

(52) U.S. Cl.
CPC .............. *H04W 4/14* (2013.01); *H04W 8/24* (2013.01); *H04W 48/16* (2013.01); *H04W 76/11* (2018.02); *H04W 80/10* (2013.01)

(58) Field of Classification Search
CPC .................................. H04W 4/14; H04W 8/24
See application file for complete search history.

(56) References Cited

U.S. PATENT DOCUMENTS 6,292,669 B1  9/2001  Meuronen et al.
8,099,117 B2  1/2012  Bhatt et al.
(Continued)

FOREIGN PATENT DOCUMENTS

CN   1262849 A    8/2000
CN   101026861 A  8/2007
(Continued)

OTHER PUBLICATIONS

3GPP TS 23.272 V13.4.0 (Jun. 2016);3rd Generation Partnership Project;Technical Specification Group Services and System Aspects;Circuit Switched (CS) fallback in Evolved Packet System (EPS);Stage 2(Release 13);total 103 pages.
(Continued)

*Primary Examiner* — Hassan Kizou
(74) *Attorney, Agent, or Firm* — Kilpatrick Townsend & Stockton LLP

(57) ABSTRACT

This application relates to the field of wireless communications technologies, and provides a short message transmission method. The method includes: receiving, by a communications device, uplink data and indication information used to indicate that the uplink data belongs to a short message service; determining identification information used to identify a short message function entity device that processes the short message service; and sending the uplink data to the short message function entity based on the indication information and the identification information; or includes: receiving, by a communications device from a terminal device, uplink data and a session identifier that is used to identify a session for processing the short message service; determining identification information associated with the session identifier; and sending the uplink data to the short message function entity based on the identification information.

10 Claims, 11 Drawing Sheets

(51) Int. Cl.
*H04W 8/24* (2009.01)
*H04W 48/16* (2009.01)
*H04W 80/10* (2009.01)

(56) References Cited

U.S. PATENT DOCUMENTS

| | | | |
|---|---|---|---|
| 2010/0304765 A1 | 12/2010 | Bhatt et al. | |
| 2012/0135761 A1* | 5/2012 | Nenner | H04W 4/14 |
| | | | 455/466 |
| 2015/0092547 A1 | 4/2015 | Wu et al. | |
| 2018/0227752 A1* | 8/2018 | Teyeb | H04W 12/003 |
| 2018/0227978 A1* | 8/2018 | Keller | H04W 76/16 |
| 2019/0349721 A1* | 11/2019 | Zhu | H04W 76/11 |
| 2020/0059989 A1* | 2/2020 | Velev | H04W 36/12 |
| 2020/0213819 A1* | 7/2020 | Kim | H04W 4/14 |
| 2020/0267223 A1* | 8/2020 | Baek | H04W 12/08 |

FOREIGN PATENT DOCUMENTS

| | | | | |
|---|---|---|---|---|
| CN | 104170443 A | 11/2014 | | |
| CN | 103477659 B | 9/2016 | | |
| KR | 20110122029 A | 11/2011 | | |
| TW | I451723 B | 9/2014 | | |
| WO | 2012138107 A2 | 10/2012 | | |
| WO | WO-2013185330 A1 * | 12/2013 | | H04W 28/0289 |
| WO | 2016198936 A1 | 12/2016 | | |

OTHER PUBLICATIONS

3GPP TR 23.799 V14.0.0 (Dec. 2016);3rd Generation Partnership Project;Technical Specification Group Services and System Aspects;Study on Architecture for Next Generation System(Release 14);total 522 pages.
3GPP TS 23.040 V13.2.0 (Sep. 2016);3rd Generation Partnership Project;Technical Specification Group Core Network and Terminals;Technical realization of the Short Message Service (SMS)(Release 13);total 214 pages.
3GPP TS 23.501 V0.0.0 (Jan. 2017);3rd Generation Partnership Project;Technical Specification Group Services and System Aspects;System Architecture for the 5G System;Stage 2;(Release 15);total 14 pages.
3GPP TS 23.502 V0.0.0 (Jan. 2017);3rd Generation Partnership Project;Technical Specification Group Services and System Aspects;Procedures for the 5G System;Stage 2; (Release 15);total 13 pages.
Qualcomm Incorporated,"SMS over 5G NAS",SA WG2 Meeting #118BIS S2-170225,Jan. 16-20, 2017, Spokane, US,total 5 pages.
Nokia et al.,"SMS over NAS for 5G",SA WG2 Meeting #118BIS S2-170439 (revision of S2-170284+S2-170225), Jan. 16-20, 2017, Spokane, Washington, USA,total 6 pages.
Nokia et al.,"TS 23.501: P-CR to update SMS architecture and functional description",SA WG2 Meeting #119 S2-171016171307265(was S2-171265xxxx),Jan. 16-20, 2017, Dubrovnik, Croatia,total 7 pages.

* cited by examiner

SHORT MESSAGE TRANSMISSION METHOD, DEVICE, AND SYSTEM

CROSS-REFERENCE TO RELATED APPLICATIONS

This application is a continuation of International Application No. PCT/CN2017/072509, filed on Jan. 24, 2017, the disclosure of which is hereby incorporated by reference in its entirety.

TECHNICAL FIELD

This application relates to the field of wireless communications technologies, and in particular, to a short message transmission method, a device, and a system.

BACKGROUND

A short message service (SMS) is a widely applied telecommunications service. A short message is a non-real-time reliable data packet that can be transmitted in a public land mobile network (PLMN) through a signaling channel. A point-to-point data transmission service can be implemented by using the short message service. A point-to-point short message service includes a mobile terminated short message (MT SM) service and a mobile originated short message (MO SM) service.

In an existing 4G network, when a short message service needs to be performed, a short message may be transmitted to a short message center through an SGs interface between a mobility management entity (MME) and a mobile switching center (MSC). With the development of 5G networks, how to implement transmission of a non-access stratum (NAS) short message in a 5G network architecture needs to be urgently resolved.

SUMMARY

This application describes a short message transmission method, a device, and a system.

According to one aspect, an embodiment of this application provides a short message transmission method. The method includes: receiving, by a communications device (for example, an access and mobility management function AMF device), uplink data and indication information from a terminal device, where the indication information is used to indicate that the uplink data belongs to a short message service; determining, by the communications device, identification information, where the identification information is used to identify a short message function entity device (for example, a session management function SMF device) that processes the short message service; and sending, by the communications device, the uplink data to the short message function entity based on the indication information and the identification information. According to the solution provided in this embodiment, after uplink short message data arrives at the communications device, the communications device may send, based on the indication information and the obtained identification information, the uplink short message data to the SMF device that is capable of processing the short message service and that has completed short message service registration. In this way, uplink short message transmission is implemented in a next-generation mobile network architecture.

For the step of determining identification information, if the communications device has stored the identification information, the determining may be implemented directly by using the identification information. If the communications device does not have the identification information yet, the identification information may be obtained through an additional step, to implement the determining. The communications device may first receive the uplink data and the indication information from the terminal device, and then obtain the identification information; or may first obtain the identification information, and then receive the uplink data and the indication information from the terminal device. For example, the short message service registration may also be triggered by data (uplink data or downlink data). In other words, the short message service registration for the terminal device is not triggered until a network needs to forward short message data, so that user context storage load on a core network can be reduced.

In a possible design, the method further includes: sending, by the communications device, a first request message (for example, a registration trigger request message) to the short message function entity device; and receiving, by the communications device, a first response message (for example, a registration trigger response message) from the short message function entity device, where the first response message is used to indicate that the short message function entity device successfully registers the short message service. The first request message may trigger the short message function entity device to register the short message service with a subscriber data management SDM device, so that after a short message arrives subsequently, downlink short message data can be routed based on the identification information registered in the subscriber data management device.

In a possible design, the step of determining, by the communications device, the identification information includes: obtaining, by the communications device, an association between the identification information and the terminal device. In other words, the communications device may obtain the identification information at a granularity of a terminal device.

In a possible design, before the sending, by the communications device, the first request message to the short message function entity device, the method further includes: receiving, by the communications device, an attach request message from the terminal device, where the attach request message carries capability information, and the capability information is used to trigger the communications device to send the first request message; or after receiving the uplink data from the terminal device, determining, by the communications device, that the communications device does not have the identification information; or receiving, by the communications device, a notification message from a subscriber data management device, where the notification message carries a cause value: a mobile terminated short message service MT-SMS, and the cause value is used to trigger the communications device to send the first request message.

In the first manner described above, the short message function entity device may be triggered to register the short message service with the subscriber data management device in an attach procedure. In the second manner, the short message function entity device may be triggered only after the arrival of the uplink short message data, to register the short message service with the subscriber data management device in an attach procedure. In the third manner, the short message function entity device may be triggered only after the arrival of the downlink short message data, to register the short message service with the subscriber data management device in an attach procedure. The second and third manners can further reduce the user context storage load on the core network.

In a possible design, the first request message carries a mobile terminated short message service MT-SMS indication.

In a possible design, the first response message further carries downlink short message data. Returning the downlink short message data through the first response message can reduce signaling exchange between network elements of a core network.

In a possible design, the step of determining, by the communications device, the identification information includes: sending, by the communications device, a request message to a network function discovery device, where the request message carries a type of a requested network function: a short message function; and receiving, by the communications device, a response message from the network function discovery device, where the response message carries the identification information. For example, when the communications device does not have the identification information yet, the communications device may request the identification information from the network function discovery device.

In a possible design, the step of determining, by the communications device, the identification information includes: searching for, by the communications device, a context of the terminal device to obtain the identification information associated with the terminal device, where the context includes the association between the terminal device and the identification information. For example, after the communications device has stored the identification information, the communications device may directly determine the identification information based on the context of the identification information.

According to another aspect, this application further discloses a short message transmission method, including: receiving, by a short message function entity device (for example, a session management function SMF device), a first request message (for example, a registration trigger request message) from a communications device (for example, an access and mobility management function AMF device); sending, by the short message function entity device, a second request message (for example, a registration request message) to a subscriber data management SDM device based on the first request message, where the second request message includes identification information, and the identification information is used to identify the short message function entity device that processes the short message service; receiving, by the short message function entity device, a second response message (for example, a registration response message) from the SDM device, where the second response message carries subscription data of the short message service; and sending, by the short message function entity device, a first response message (for example, a registration trigger response message) to the communications device, where the first response message indicates that the short message function entity device successfully registers the short message service. According to the solution provided in this embodiment, the short message function entity device registers the short message service with the subscriber data management SDM device, so that after a short message arrives subsequently, downlink short message data can be routed based on the identification information registered in the subscriber data management device.

In a possible design, the method further includes: receiving, by the short message function entity device, downlink short message data from a short message center or the SDM device, where the first response message further includes the downlink short message data. Returning the downlink short message data through the first response message can reduce signaling exchange between network elements of a core network.

According to another aspect, this application further discloses a short message transmission method, including: receiving, by a subscriber data management SDM device, a route lookup request message from a short message center, to query identification information, where the identification information is used to identify a short message function entity device (for example, a session management function SMF device) that processes a short message service; if the SDM device does not have the identification information, sending, by the SDM device, a notification message to a communications device (for example, an access and mobility management function AMF device), where the notification message includes a cause value: a mobile terminated short message service MT-SMS, and the cause value is used to trigger the communications device to send a first request message (for example, a registration trigger request message) to the short message function entity device; receiving, by the SDM device, a second request message (for example, a registration request message) from the short message function entity device, where the second request message includes the identification information; and sending, by the SDM device, a second response message (for example, a registration response message) to the short message function entity device, where the second response message carries subscription data of the short message service. According to the solution provided in this embodiment, the short message function entity device may be triggered only after the arrival of downlink short message data, to register the short message service with the subscriber data management device in an attach procedure, so that short message transmission can be implemented in a next-generation mobile network architecture. In addition, user context storage load on a core network can be reduced.

In a possible design, the method further includes: sending, by the SDM device, the identification information to the SMC.

In a possible design, after the SDM device receives the route lookup request message from the SMC, the method further includes: receiving, by the SDM device, downlink short message data from the SMC, where the second response message carries the downlink short message data.

According to another aspect, this application further discloses a short message transmission method, including: sending, by a terminal device, uplink data and indication information to a communications device (for example, an access and mobility management function AMF device), where the indication information is used to indicate that the uplink data belongs to a short message service. According to the solution provided in this embodiment, after receiving the uplink data and the indication information, the communications device may learn, based on the indication information, that the uplink data belongs to the short message service; find, based on the indication information, a short message function entity device that processes the short message service; and then trigger the short message function entity device to register the short message service with a subscriber data management SDM device, thereby implementing short message transmission.

In a possible design, the method further includes: sending, by the terminal device, an attach request message to the communications device, where the attach request message carries capability information, and the capability information is used to trigger the communications device to send a first request message, thereby triggering registration of the short message service. In this manner, the short message function entity device may be triggered to register the short message service with the subscriber data management device in an attach procedure.

According to another aspect, this application further discloses a short message transmission method, including: receiving, by a communications device (for example, an access and mobility management function AMF device), uplink data and a session identifier from a terminal device, where the session identifier is used to identify a session for processing a short message service; determining, by the communications device, identification information associated with the session identifier, where the identification information is used to identify a short message function entity device (for example, a session management function SMF device) that processes the short message service; and sending, by the communications device, the uplink data to the short message function entity based on the identification information associated with the session identifier. According to the solution provided in this embodiment, after uplink short message data arrives at the communications device, the communications device sends, based on the session identifier, the uplink short message data to the SMF device that is capable of processing the short message service and that has completed short message service registration. In this way, uplink short message transmission is implemented in a next-generation mobile network architecture.

For the step of determining identification information associated with the session identifier, if the communications device has stored the identification information associated with the session identifier, the determining may be implemented directly by using the identification information. If the communications device does not have the identification information associated with the session identifier yet, the identification information associated with the session identifier may be obtained through an additional step, to implement the determining. The communications device may first receive the uplink data and the session identifier from the terminal device, and then obtain an association between the session identifier and the identification information; or may first obtain an association between the session identifier and the identification information, and then receive the uplink data and the session identifier from the terminal device. For example, registration of the short message service may be triggered by a service. To be specific, when uplink data or downlink data of the terminal arrives at a core network and needs to be forwarded, the core network determines an identifier of the short message function entity device, and triggers the short message function entity device to register the short message service, thereby registering the short message service as required, and reducing user context storage load on the core network.

In a possible design, the method further includes: sending, by the communications device, a first request message (for example, a registration trigger request message) to the short message function entity device, where the first request message carries a DNN of the short message service and the session identifier; and receiving, by the communications device, a first response message (for example, a registration trigger response message) from the short message function entity device, where the first response message is used to indicate that the short message function entity device successfully registers the short message service. The first request message may trigger the short message function entity device to register the short message service with a subscriber data management SDM device, so that after a short message arrives subsequently, downlink short message data can be routed based on the identification information registered in the subscriber data management device.

In a possible design, before the sending, by the communications device, the first request message to the short message function entity device, the method further includes:
receiving, by the communications device, an attach request message from the terminal device, where the attach request message carries the DNN and the session identifier; or
receiving, by the communications device, a session request message from a subscriber data management SDM device, where the session request message carries the DNN; and obtaining the session identifier in a session establishment process.

In the first manner described above, the short message function entity device may be triggered to register the short message service with the subscriber data management device in an attach procedure. In the second manner, the short message function entity device may be triggered only after the arrival of the downlink short message data, to register the short message service with the subscriber data management device in an attach procedure. The second manner can further reduce user context storage load on a core network.

In a possible design, the first request message carries a mobile terminated short message service MT-SMS indication.

In a possible design, the first response message further carries the downlink short message data. Returning the downlink short message data through the first response message can reduce signaling exchange between network elements of a core network.

In a possible design, if the terminal device is in an idle state, the method further includes: sending, by the communications device, a paging message to the terminal device, where the paging message carries a cause value: a mobile terminated short message service MT-SMS, and the paging message is used to trigger context setup of a session for the short message service.

In a possible design, the step of determining, by the communications device, the identification information associated with the session identifier includes: sending, by the communications device, a request message to a network function discovery device, where the request message carries the DNN and a type of a requested network function: a short message function; receiving, by the communications device, a response message from the network function discovery device, to obtain the identification information, where the response message carries the identification information; and associating, by the communications device, the identification information with the session identifier. For example, when the communications device does not have the identification information yet, the communications device may request the identification information from the network function discovery device.

In a possible design, the step of determining, by the communications device, the identification information associated with the session identifier includes: searching for, by the communications device, a context of the terminal device to obtain the identification information associated with the session identifier, where the context includes an association between the session identifier and the identification information. For example, after the communications device has stored the identification information associated with the session identifier, the communications device may directly determine the identification information based on the context of the identification information.

In a possible design, the communications device may send uplink short message data or downlink short message data through the session for the short message.

According to another aspect, this application further discloses a short message transmission method, including: receiving, by a short message function entity device (for example, a session management function SMF device), a first request message (for example, a registration trigger request message) from a communications device (for example, an access and mobility management function AMF device), where the first request message carries a DNN of a short message service and a session identifier, and the session identifier is used to indicate a session for the short message service; sending, by the short message function entity device, a second request message (for example, a registration request message) to a subscriber data management SDM device based on the first request message, where the second request message includes identification information, and the identification information is used to identify the short message function entity device that processes the short message service; receiving, by the short message function entity device, a second response message (for example, a registration response message) from the SDM device, where the second response message carries subscription data of the short message service; and sending, by the short message function entity device, a first response message (for example, a registration trigger response message) to the communications device, where the first response message indicates that the short message function entity device successfully registers the short message service. According to the solution provided in this embodiment, the short message function entity device registers the short message service with the subscriber data management SDM device, so that after a short message arrives subsequently, downlink short message data can be routed based on the identification information registered in the subscriber data management device.

In a possible design, the method further includes: receiving, by the short message function entity device, downlink short message data from a short message center or the SDM device, where the first response message further includes the downlink short message data. Returning the downlink short message data through the first response message can reduce signaling exchange between network elements of a core network.

In a possible design, the short message function entity device may transmit uplink short message data or a downlink short message data through the session for the short message.

According to another aspect, this application further discloses a short message transmission method, including: receiving, by a subscriber data management SDM device, a route lookup request message from a short message center, to query identification information, where the identification information is used to identify a short message function entity device (for example, a session management function SMF device) that processes a short message service; if the SDM device does not have the identification information, sending, by the SDM device, a session request message to a communications device (for example, an access and mobility management function AMF device), where the session request message carries a DNN of the short message service, and the session request message is used to trigger setup of a session for the short message service; receiving, by the SDM device, a second request message (for example, a registration request message) from the short message function entity device, where the second request message includes the identification information; and sending, by the SDM device, a second response message (for example, a registration response message) to the short message function entity device, where the second response message carries subscription data of the short message service. According to the solution provided in this embodiment, the short message function entity device may be triggered only after the arrival of downlink short message data, to register the short message service with the subscriber data management device in an attach procedure, so that short message transmission can be implemented in a next-generation mobile network architecture. In addition, user context storage load on a core network can be reduced.

In a possible design, the method further includes: sending, by the SDM device, the identification information to the SMC.

In a possible design, after the SDM device receives the route lookup request message from the SMC, the method further includes: receiving, by the SDM device, downlink short message data from the SMC, where the second response message carries the downlink short message data.

According to another aspect, this application further discloses a short message transmission method, including: sending, by a terminal device, uplink data and a session identifier to a communications device (for example, an access and mobility management function AMF device), where the session identifier is used to identify a session for processing the short message service. According to the solution provided in this embodiment, after receiving the uplink data and the session identifier, the communications device may determine, based on the session identifier, identification information associated with the session identifier; find a short message function entity device that processes the short message service; and then trigger the short message function entity device to register the short message service with a subscriber data management SDM device, thereby implementing short message transmission.

In a possible design, the method further includes: sending, by the terminal device, an attach request message to the communications device, where the attach request message carries a DNN of the short message service and the session identifier, thereby triggering registration of the short message service. In this manner, the short message function entity device may be triggered to register the short message service with the subscriber data management device in an attach procedure.

According to another aspect, an embodiment of this application provides a communications device (for example, an access and mobility management function AMF device), where the communications device has functions of implementing behaviors of the communications device in the foregoing methods. The functions may be implemented by hardware, or may be implemented by hardware executing corresponding software. The hardware or software includes one or more modules that correspond to the foregoing functions. In a possible design, a structure of the communications device includes a processor and a transceiver, where the processor is configured to support the communications device in performing a corresponding function in the foregoing methods, and the transceiver is configured to implement communication between the communications device and the foregoing terminal device/short message function entity device/subscriber data management device. The communications device may further include a memory, where the memory is configured to be coupled to the processor, and the memory stores a program instruction and data that are necessary for the communications device.

According to another aspect, an embodiment of this application provides a short message function entity device (for example, a session management function SMF device), where the communications device has functions of implementing behaviors of the short message function entity device in the foregoing methods. The functions may be implemented by hardware, or may be implemented by hardware executing corresponding software. The hardware or software includes one or more modules that correspond to the foregoing functions. In a possible design, a structure of the short message function entity device includes a processor and a transceiver, where the processor is configured to support the communications device in performing a corresponding function in the foregoing methods, and the transceiver is configured to implement communication between the short message function entity device and the foregoing communications device/subscriber data management device/short message center. The short message function entity device may further include a memory, where the memory is configured to be coupled to the processor, and the memory stores a program instruction and data that are necessary for the short message function entity device.

According to another aspect, an embodiment of this application provides a subscriber data management SDM device, where the subscriber data management device has functions of implementing behaviors of the subscriber data management device in the foregoing methods. The functions may be implemented by hardware, or may be implemented by hardware executing corresponding software. The hardware or software includes one or more modules that correspond to the foregoing functions. In a possible design, a structure of the subscriber data management device includes a processor and a transceiver, where the processor is configured to support the subscriber data management device in performing a corresponding function in the foregoing methods, and the transceiver is configured to implement communication between the subscriber data management device and the foregoing communications device/short message function entity device/short message center. The subscriber data management device may further include a memory, where the memory is configured to be coupled to the processor, and the memory stores a program instruction and data that are necessary for the subscriber data management device.

According to another aspect, an embodiment of this application provides a terminal device, where the terminal device has functions of implementing behaviors of the terminal device in the foregoing methods. The functions may be implemented by hardware, or may be implemented by hardware executing corresponding software. The hardware or software includes one or more modules that correspond to the foregoing functions. In a possible design, a structure of the terminal device includes a processor and a transceiver, where the processor is configured to support the terminal device in performing a corresponding function in the foregoing methods, and the transceiver is configured to implement communication between the terminal device and the foregoing communications device. The terminal device may further include a memory, where the memory is configured to be coupled to the processor, and the memory stores a program instruction and data that are necessary for the terminal device.

According to another aspect, an embodiment of this application provides a communications system, where the system includes the communications device and the short message function entity device that are described in the foregoing aspects. Optionally, the system may further include the subscriber data management SDM device in the foregoing aspects.

According to another aspect, an embodiment of this application provides a computer readable storage medium, where the computer readable storage medium stores an instruction, and when the instruction runs on a computer, the computer performs the methods according to the foregoing aspects.

According to another aspect, an embodiment of this application provides a computer program product including an instruction, where when the instruction runs on a computer, the computer performs the methods according to the foregoing aspects.

According to the technical solutions provided in the embodiments of this application, after the uplink short message data arrives at the communications device, the communications device may determine, based on the indication information or the session identifier, the identification information of the short message function entity device capable of processing the short message service, and send the uplink short message data to the short message function entity device that is capable of processing the short message service and that has completed short message service registration. In this way, the uplink short message transmission is implemented in the next-generation mobile network architecture.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly describes the technical solutions in the embodiments of this application with reference to the accompanying drawings in the embodiments of this application.

Figure 1:
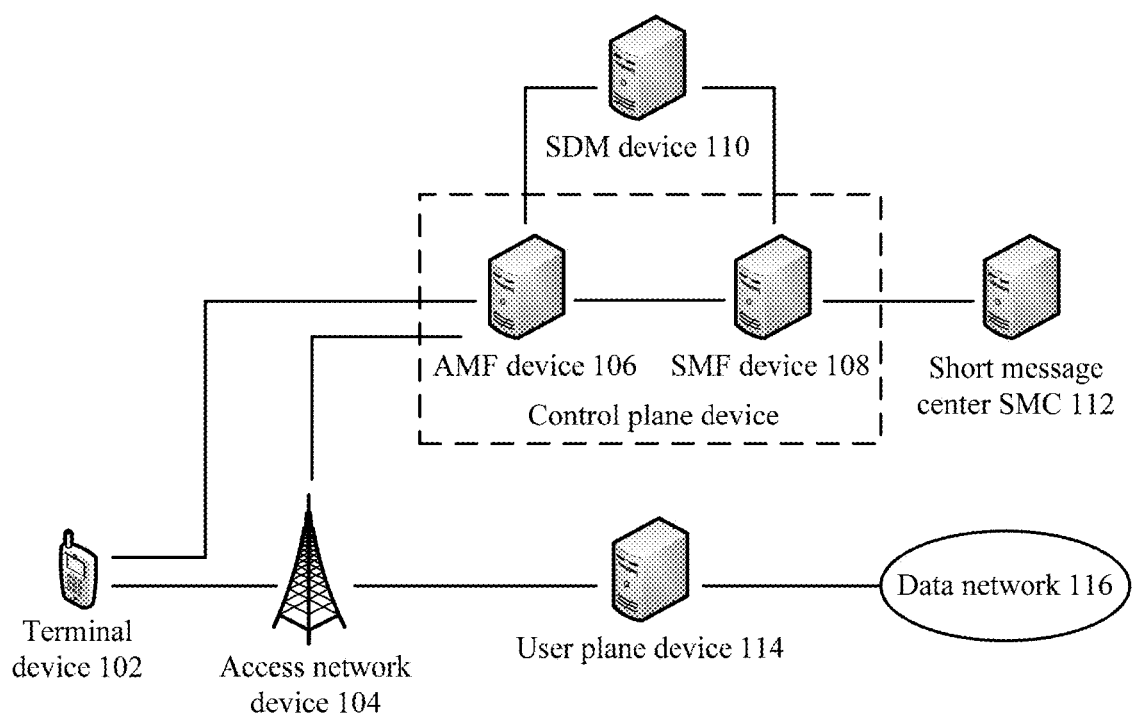
FIG. 1 is a schematic diagram of a communications system according to an embodiment of this application.

Based on a communications system shown in FIG. 1, an embodiment of this application provides a solution, applicable to implementation of NAS short message transmission in a next-generation mobile network (for example, a 5G network) architecture. For example, in a 5G mobile network architecture, a control plane function and a forwarding plane function of a mobile gateway are decoupled, and the separated control plane function of the mobile gateway is combined with a conventional control network element MME, policy and charging rules function (PCRF), and the like of the 3rd Generation Partnership Project (3GPP) into a unified control plane device. A user plane device can implement user plane functions (SGW-U and PGW-U) of a serving gateway (SGW) and a packet data network gateway (PGW). Further, the unified control plane device may be decomposed into an access and mobility management function (AMF) device and a session management function (SMF) device. The AMF device may be responsible for procedures such as attach, mobility management, and tracking area update of a terminal device. The SMF device may be responsible for session management of a terminal device, selection of a user plane device, reselection of a user plane device, Internet Protocol (IP) address allocation, quality of service (QoS) control, bearer setup, bearer modification, and bearer release, and the like.

In addition, the embodiments of this application may be further applicable to other future-oriented communications technologies. The technical solutions provided in the embodiments of this application are applicable to any communications system using a new communications technology and including a device responsible for mobility management and a device responsible for session management. A system architecture and a service scenario described in the embodiments of this application are intended to describe the technical solutions in the embodiments of this application more clearly, but are not construed as a limitation to the technical solutions provided in the embodiments of this application. A person of ordinary skill in the art may know that, as the network architecture evolves and a new service scenario emerges, the technical solutions provided in the embodiments of this application are also applicable to a similar technical problem.

As shown in FIG. 1, an embodiment of this application provides a communications system 100. For example, the communications system 100 includes a terminal device 102, an access network device 104, an AMF device 106, an SMF device 108, a subscriber data management (SDM) device 110, a short message center (SMC) 112, a user plane device 114, and a data network (DN) 116.

The terminal device 102 in this embodiment of this application may include various devices having a wireless communication function, such as a handheld device, an in-vehicle device, a wearable device, a computing device, or another processing device connected to a wireless modem. The terminal device may also be referred to as user equipment (UE), a mobile station (MS), or a terminal, and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or the like.

The access network device 104 in this embodiment of this application is an apparatus that is deployed in a radio access network to provide a wireless communication function for the terminal device 102. The access network device may include base stations in various forms, such as a macro base station, a micro base station (also referred to as a small cell), a relay station, and an access point. In systems using different radio access technologies, devices having a base station function may have different names. For example, in an LTE system, the device is referred to as an evolved NodeB (eNB or eNodeB); and in a 3rd generation (3G) system, the device is referred to as a NodeB.

The AMF device 106 in this embodiment of this application may be responsible for procedures such as attach, mobility management, and tracking area update of a terminal device.

The SMF device 108 in this embodiment of this application may be responsible for session management of a terminal device, selection of a user plane device (for example, the user plane device 114), reselection of a user plane device, IP address allocation, QoS control, bearer setup, bearer modification, and bearer release.

The SDM device 110 in this embodiment of this application may be responsible for storage of user subscription data (for example, subscription data related to mobility management and subscription data related to session management).

The SMC 112 in this embodiment of this application may implement functions such as short message receiving, storage, and forwarding, and short message status reporting.

An embodiment of this application provides a short message transmission method: terminating NAS signaling for a 5G short message at the SMF device 108. The SMF device 108 serves as a short message function entity device, processes short message data, and exchanges the short message data with the short message center 112. The SMF device 108 is a control plane device having a session attribute. Therefore, in the short message transmission method of this application, a short message may be decoupled from a session, and transmitted by using only NAS signaling; or may be bound to a session, and transmitted through a session that is established by a core network for a short message service. The following describes the short message transmission method in this embodiment of this application with reference to embodiments of FIG. 2 to FIG. 8. In the methods shown in FIG. 2 to FIG. 5, the short message and the session are decoupled. In the methods shown in FIG. 6 to FIG. 8, the short message and the session are bound.

FIG. 2 to FIG. 5 are schematic flowcharts of a short message transmission method using only NAS signaling according to an embodiment of this application. In an example in FIG. 2, the terminal device 102 adds capability information to an attach request; and after receiving the capability information, the AMF device 106 determines the SMF device 108 capable of processing a short message service for the terminal device 102, to trigger the SMF device 108 to register the short message service with the SDM device 110. In other words, a short message service registration process may be implemented in an attach procedure of the terminal device 102. In an example in FIG. 3, a short message service is not registered in an attach procedure of the terminal device 102; and only after the terminal device 102 sends an uplink short message (MO SM), the AMF device 106 determines the SMF device 108 capable of processing a short message service for the terminal device 102, to trigger the SMF device 108 to register the short message service with the SDM device 110. Similarly, in examples in FIG. 4 and FIG. 5, a short message service is not registered in an attach procedure of the terminal device 102; and after a downlink short message (MT SM) arrives at the short message center 112, the SDM device 110 triggers, based on an identifier of the AMF device 106 stored in the attach procedure, the AMF device 106 to determine the SMF device 108 capable of processing a short message service for the terminal device 102, to trigger the SMF device 108 to register the short message service with the SDM device 110.

Figure 3:
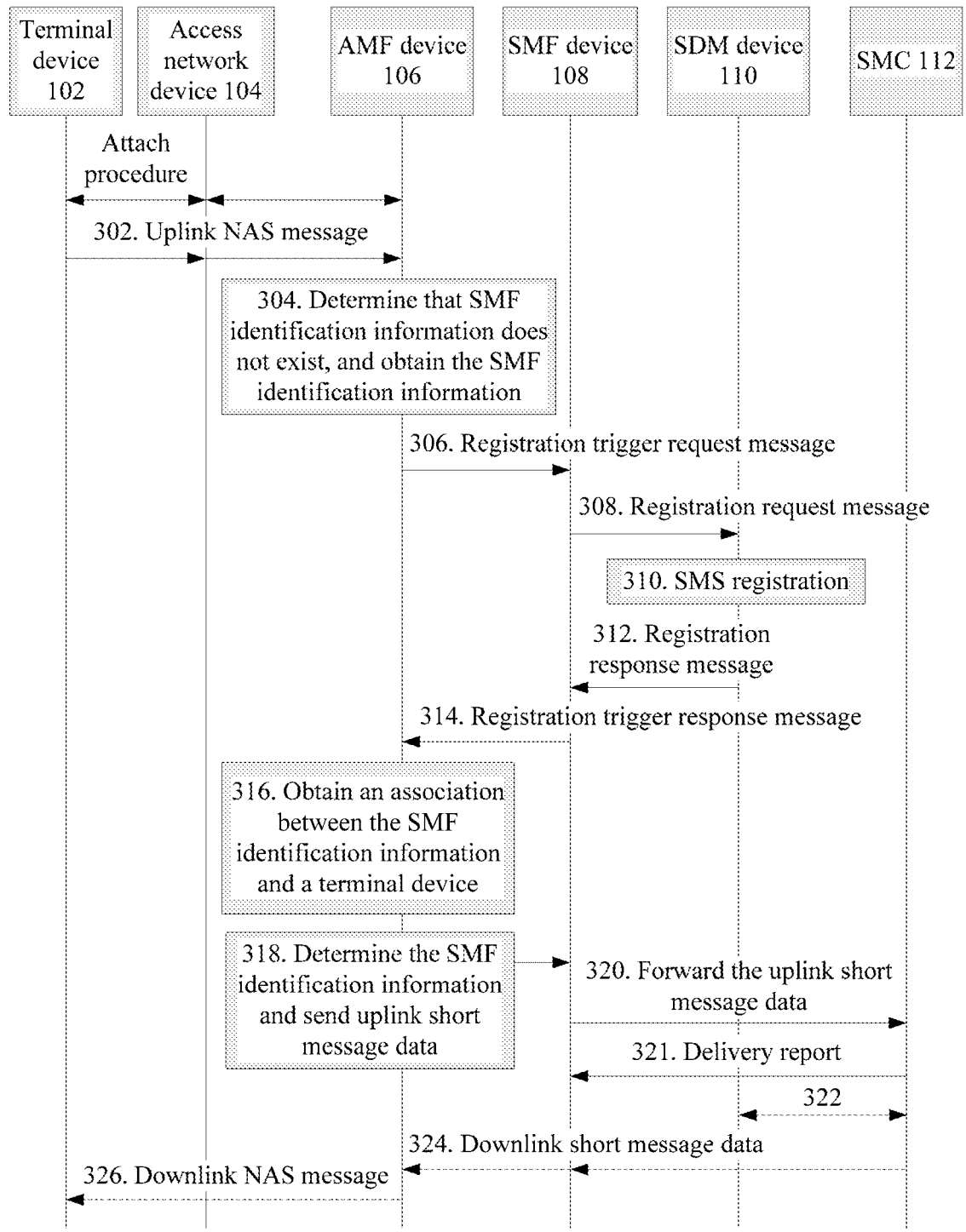
Figure 4:
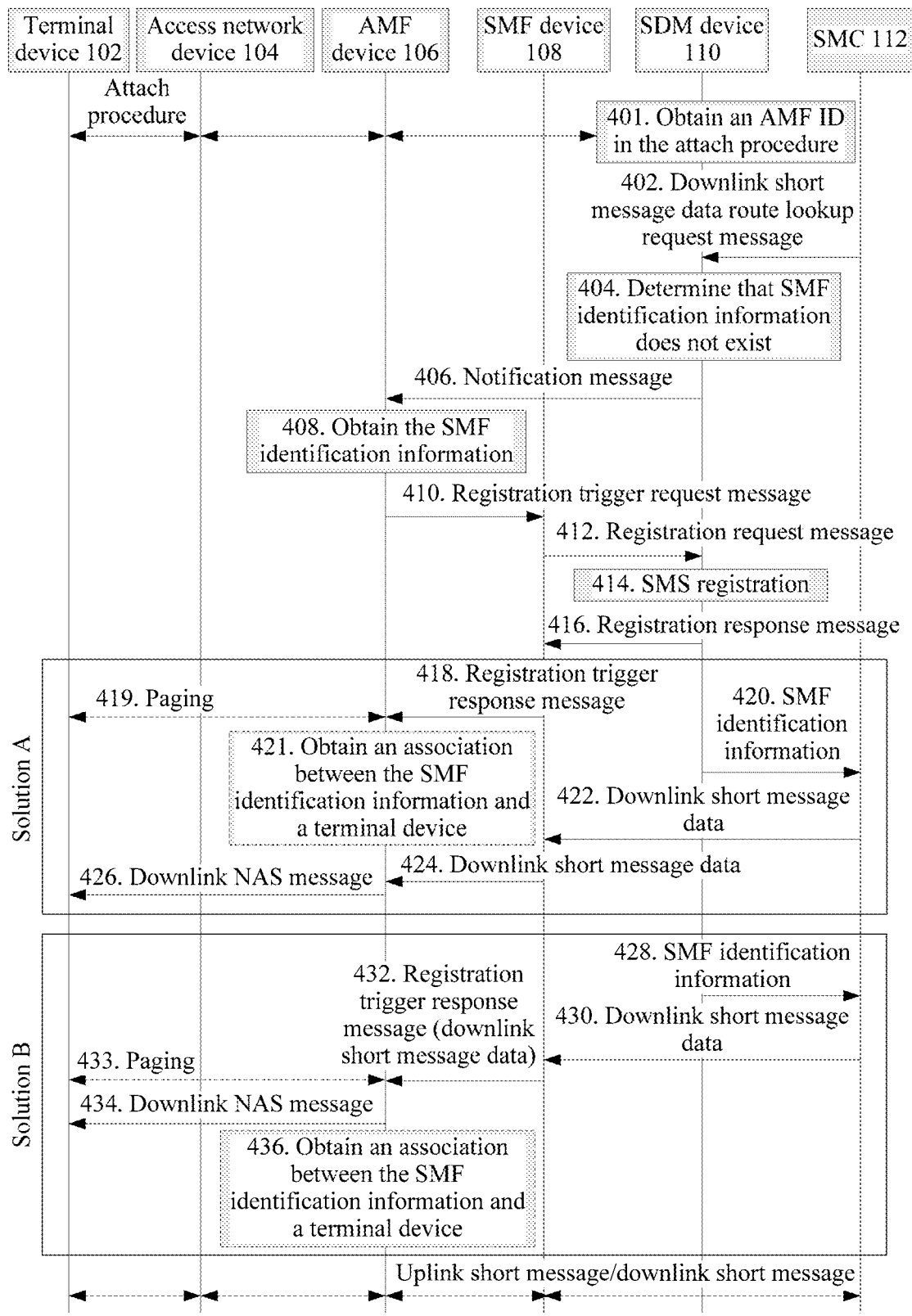
Figure 5:
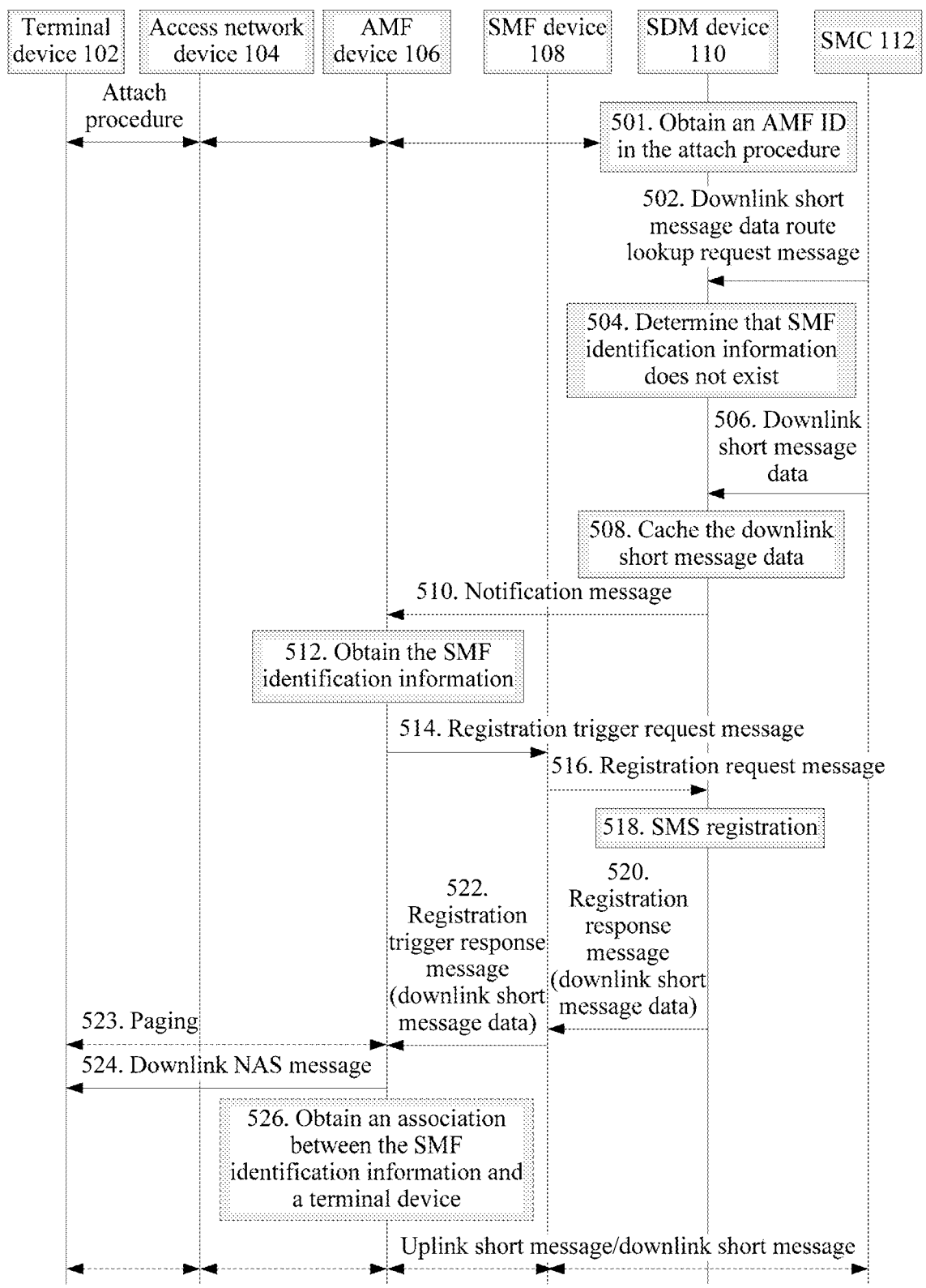

FIG. 3 to FIG. 5 are all applicable to a scenario in which the terminal device 102 has no short message service for a relatively long period of time after being powered on and attached. In the example in FIG. 3, registration of a short message service may be triggered by an originated short message (namely, the uplink short message) of the terminal device 102. In the examples in FIG. 4 and FIG. 5, registration of a short message service may be triggered by a downlink short message. For example, in some actual scenarios, even if the terminal device 102 attaches to a network, a mobile originated short message service may be used infrequently. With the emergence of more applications, verification of a user identity by obtaining a short message verification code as a dynamic password to log in to an application or website account gradually becomes popular, and short message subscription (for example, for bank card balance notifications) is also quite common in daily life. In this behavior pattern, the terminal device 102 does not actively initiate transmission of a short message service, but receives some short message notification information (for example, service short messages about a weather forecast, an insufficient balance, and the like) from a website or an operator. In this scenario, a registration procedure of a short message service may be triggered by a downlink short message. Optionally, FIG. 3 may be used in combination with FIG. 4 or FIG. 5, depending on an occurrence sequence of the uplink short message and the downlink short message.

Figure 2:
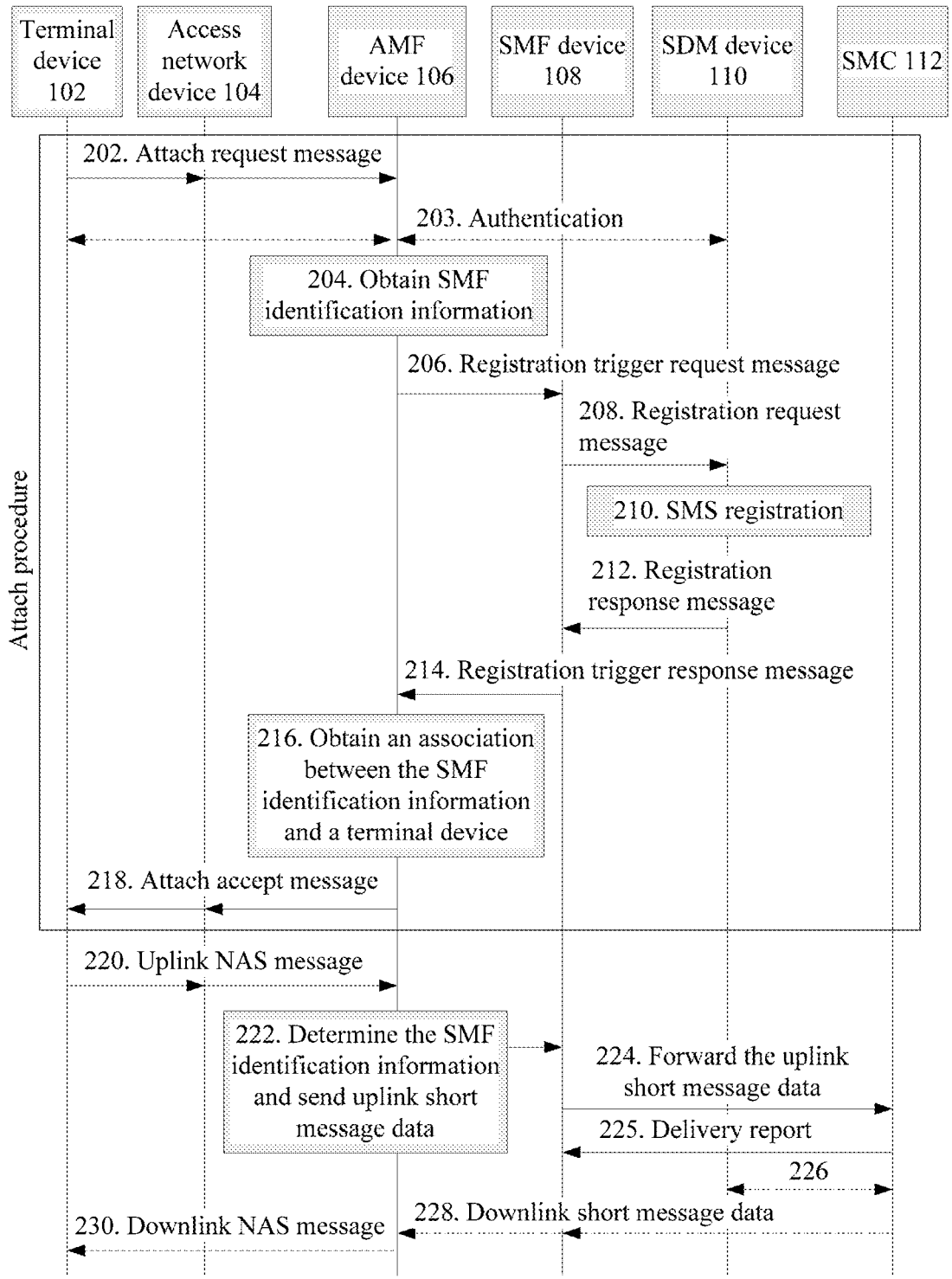
FIG. 2 to FIG. 8 are schematic flowcharts of a short message transmission method according to an embodiment of this application.

For example, in the example in FIG. 2, the short message transmission method includes the following steps.

In step 202, the terminal device 102 sends an attach request message to the AMF device 106 via the access network device 104. For example, the attach request message carries capability information. The capability information is used to trigger the AMF device 106 to send a registration trigger request message to an SMF device, to trigger a registration procedure of a short message service. In addition, the attach request message may further carry an international mobile subscriber identity (IMSI) used to identify the terminal device 102.

In step 204, the AMF device 106 obtains SMF identification information of an SMF device (for example, the SMF device 108) capable of processing the short message service.

For example, the AMF device 106 sends a request message to a network function discovery device. The request message carries a type of a requested network function: a short message function.

After receiving the request message, the network function discovery device selects the SMF device (for example, the SMF device 108) capable of processing the short message service, and returns a response message carrying the SMF identification information to the AMF device. The SMF identification information is used to identify the SMF device 108 that processes the short message service. For example, the SMF identification information includes an identifier ID or address of the SMF device that processes the short message service.

For example, the network function discovery device may be a domain name server (DNS) or a network function repository function (NRF).

Optionally, the SMF address may be used to route only uplink short message data, or route both uplink short message data and downlink short message data.

Optionally, before step 204, the AMF device 106 may obtain subscription information of the terminal device 102 from the SDM device 110 through step 203, to authenticate the terminal device 102. The AMF device 106 obtains the SMF identification information for the terminal device 102 only after the terminal device 102 is authenticated.

In step 206, the AMF device 106 sends the registration trigger request message to the SMF device 108. For example, the registration trigger request message may carry the IMSI and an identifier of the AMF device 106. Optionally, the registration trigger request message may further carry the foregoing capability information.

In step 208, the SMF device 108 sends a registration request message to the SDM device 110, to register the short message service with the SDM device 110, where the registration request message carries the SMF identification information used to route downlink short message data. For example, the registration request message may carry the SMF identification information received in step 206: the ID or address of the SMF device. Optionally, the SMF device 108 may further allocate a dedicated SMF address for routing a downlink short message, and send the dedicated SMF address as the SMF identification information to the SDM device 110. In addition, the registration request message may further carry the IMSI and a flag bit (SMS in SMF feature flag) for the SMF to process the short message service.

In step 210, the SMF device 108 completes registration of the short message service with the SDM device 110. For example, the SDM device 110 may store the SMF identification information in the registration request message to route the downlink short message data, thereby implementing the registration of the short message service by the SMF device 108. In addition, the SDM device 110 may further store the foregoing flag bit SMS in SMF feature flag.

In step 212, the SDM device 110 sends a registration response message to the SMF device 108, to notify the SMF device 108 that the SMF device 108 successfully registers the short message service. For example, the registration response message may carry short message service subscription information of the terminal device 102. In addition, the registration response message may further carry the foregoing IMSI and flag bit SMS in SMF feature flag.

In step 214, the SMF device 108 sends a registration trigger response message to the AMF device 106, where the registration trigger response message is used to indicate that the SMF device 108 successfully registers the short message service. For example, the registration trigger response message may carry the IMSI, the SMF identification information, and the foregoing capability information.

In step 216, the AMF device 106 obtains an association between the SMF identification information and the terminal device 102. Optionally, the AMF device 106 may store the obtained association between the SMF identification information and the terminal device 102 in a context of the terminal device 102.

It should be noted that step 216 may be performed immediately after the SMF identification information is obtained in step 204; or may be performed after the registration trigger response message in step 214 is received and it is learned that the SMF device 108 has successfully registered the short message service with the SDM device 110; or may be performed at any moment between step 204 and step 214.

In step 218, the AMF device 106 sends an attach accept message to the terminal device 102 via the access network device 104, and completes an attach procedure, where the attach accept message may carry a temporary identifier ID allocated to the terminal device 102.

In step 220, the terminal device 102 encapsulates uplink short message data in an uplink NAS message, and sends the uplink NAS message to the AMF device 106 via the access network device 104, where the uplink NAS message includes uplink data and indication information, and the indication information is used to indicate that the uplink data belongs to a short message service, that is, the uplink data is the uplink short message data. In addition, the uplink NAS message may further carry the temporary identifier of the terminal device 102, current UE location information, a calling number, a called number, and the like.

In step 222, the AMF device 106 determines, based on the foregoing indication information and SMF identification information, the SMF identification information of the SMF device (the SMF device 108) capable of processing the short message service; and sends the uplink short message data to the SMF device 108.

For example, the AMF device 106 learns, based on the indication information, that the uplink NAS message carries the uplink short message data; searches the context of the terminal device 102 for the SMF identification information determined in step 216; determines, based on the SMF identification information, that an SMF device configured to process the uplink NAS message is the SMF device 108; and then sends the uplink short message data to the SMF device 108. Optionally, after receiving the uplink NAS message, the AMF device 106 first performs integrity check. The AMF device 106 sends the uplink short message data to the SMF device 108 only if the integrity check succeeds.

In step 224, after receiving the uplink short message data, the SMF device 108 forwards the uplink short message data to the short message center 112. For example, the SMF device 108 sends, based on the calling number, the uplink short message data to a short message center to which the terminal device 102 belongs. In addition, the SMF device 108 may further perform short message-related charging and lawful interception functions through an API for charging.

In step 225, after receiving the uplink short message data from the SMF device 108, the short message center 112 authenticates a calling user number segment, and returns a delivery report of declining or accepting.

According to the short message transmission method in this embodiment of this application, the SMF device 108 registers the short message service with the SDM device 110 in the attach procedure. In addition, the AMF device 106 obtains the SMF identification information of the SMF device capable of processing the short message service for the terminal device 102. After the uplink NAS message carrying the uplink short message data arrives at the AMF device 106, the AMF device 106 sends, based on the indication information in the uplink NAS message and the obtained SMF identification information, the uplink short message data to the SMF device that is capable of processing the short message service and that has completed short message service registration. In this way, uplink short message transmission is implemented in a next-generation mobile network architecture.

In addition, when a downlink short message arrives at the short message center 112, downlink short message transmission may be implemented through steps 226 to 230.

In step 226, the short message center 112 requests, from the SDM device 110, the SMF identification information (for example, the ID or address of the SMF device 108) of the SMF device that is used to route the downlink short message. Because the SMF identification information of the SMF device 108 has been registered in the SDM device 110, the SDM device 110 feeds back the SMF identification information of the SMF device 108 that may be configured to route the downlink short message.

In step 228, the short message center 112 sends the downlink short message data to the SMF device 108; and after receiving the downlink short message data, the SMF device 108 sends the downlink short message data to the AMF device 106. In addition, the SMF device 108 may further perform short message-related charging and lawful interception functions through the API for charging.

In step 230, the AMF device 106 encapsulates the downlink short message data in a downlink NAS message, and sends the downlink NAS message to the terminal device via the access network device 104.

In addition, because the SMF device 108 may further perform the short message-related charging and lawful interception functions through the API for charging, no additional API for charging is needed, and interface resources of the SMF device can be saved.

As described above, the example in FIG. 3 is applicable to the scenario in which the terminal device 102 has no short message service for a relatively long period of time after being powered on and attached. The terminal device 102 does not register a short message service during an attach procedure, and an originated short message of the terminal device 102 may trigger registration of the short message service. As shown in FIG. 3, the short message transmission method includes the following steps.

In step 302, the terminal device 102 encapsulates uplink short message data in an uplink NAS message, and sends the uplink NAS message to the AMF device 106 via the access network device 104, where the NAS message includes uplink data and indication information, and the indication information is used to indicate that the uplink data belongs to a short message service, that is, the uplink data is the uplink short message data. In addition, the uplink NAS message may further carry a temporary identifier of the terminal device 102, current UE location information, a calling number, a called number, and the like.

In step 304, after receiving the uplink data, the AMF device 106 determines that the AMF device 106 does not have SMF identification information of an SMF device that processes the short message service. For example, the AMF device 106 searches for a context of the terminal device 102 locally, where the SMF identification information does not exist in the context. After determining that the SMF identification information does not exist, the AMF device 106 obtains SMF identification information of an SMF device (for example, the SMF device 108) capable of processing the short message service.

In step 306, the AMF device 106 sends a registration trigger request message to the SMF device 108.

In step 308, the SMF device 108 sends a registration request message to the SDM device 110, to register the short message service with the SDM device 110.

In step 310, the SMF device 108 completes registration of the short message service with the SDM device 110.

In step 312, the SDM device 110 sends a registration response message to the SMF device 108, to notify the SMF device 108 that the SMF device 108 successfully registers the short message service.

In step 314, the SMF device 108 sends a registration trigger response message to the AMF device 106, where the registration trigger response message is used to indicate that the SMF device 108 successfully registers the short message service.

In step 316, the AMF device 106 obtains an association between the SMF identification information and the terminal device 102.

For steps 304 to 316, refer to the descriptions of steps 204 to 216 in FIG. 2. Details are not described herein again.

In step 318, the AMF device 106 determines, based on the foregoing indication information and SMF identification information, the SMF identification information of the SMF device (the SMF device 108) capable of processing the short message service; and sends the uplink short message data to the SMF device 108.

In step 320, after receiving the uplink short message data, the SMF device 108 forwards the uplink short message data to the short message center 112. In addition, the SMF device 108 may further perform short message-related charging and lawful interception functions through an API for charging.

In step 321, after receiving the uplink short message data from the SMF device 108, the short message center 112 authenticates a calling user number segment, and returns a delivery report of declining or accepting.

For steps 318 to 321, refer to the descriptions of steps 222 to 225 in FIG. 2. Details are not described herein again.

According to the short message transmission method in this embodiment of this application, the SMF device 108 registers the short message service with the SDM device 110 after the terminal device 102 initiates an uplink short message. In addition, the AMF device 106 obtains the SMF identification information of the SMF device capable of processing the short message service for the terminal device 102. The AMF device sends, based on the indication information in the uplink NAS message and the obtained SMF identification information, the uplink short message data to the SMF device that is capable of processing the short message service and that has completed short message service registration. In this way, uplink short message transmission is implemented in a next-generation mobile network architecture. In addition, a core network side triggers the registration of the short message service only after the arrival of the uplink short message, so that network resources used to store a user context on the core network side can be saved.

Similarly, when a downlink short message arrives at the short message center 112, downlink short message transmission may be implemented through steps 322 to 326.

In step 322, the short message center 112 requests, from the SDM device 110, the SMF identification information (for example, the ID or address of the SMF device 108) of the SMF device that is used to route the downlink short message. Because the SMF identification information of the SMF device 108 has been registered in the SDM device 110, the SDM device 110 feeds back the SMF identification information of the SMF device 108 that may be configured to route the downlink short message.

In step 324, the short message center 112 sends the downlink short message data to the SMF device 108; and after receiving the downlink short message data, the SMF device 108 sends the downlink short message data to the AMF device 106. In addition, the SMF device 108 may further perform short message-related charging and lawful interception functions through the API for charging.

In step 326, the AMF device 106 encapsulates the downlink short message data in a downlink NAS message, and sends the downlink NAS message to the terminal device via the access network device 104.

As described above, the example in FIG. 4 is applicable to the scenario in which the terminal device 102 has no short message service for a relatively long period of time after being powered on and attached. The terminal device 102 does not register a short message service during an attach procedure, and a downlink short message of the terminal device 102 may trigger registration of the short message service. As shown in FIG. 4, the short message transmission method includes the following steps.

In step 401, an attach procedure of the terminal device 102 is performed. In the attach procedure, because the AMF device 106 needs to register location information of the terminal device 102 with the SDM device 110, the SDM device 110 may obtain an identifier of the AMF device 106, namely, an AMF ID.

In step 402, after the arrival of the downlink short message, the short message center 112 sends a route request message of downlink short message data to the SDM device 110, to query routing information of the downlink short message data.

In step 404, the SDM device 110 determines that the SDM device 110 does not have SMF identification information of an SMF device that processes the short message service. For example, the SDM device 110 searches for a context of the terminal device 102 locally. Because the short message service has been registered with the SDM device 110, the foregoing SMF identification information does not exist in the context.

In step 406, after determining that the SMF identification information does not exist, the SDM device 110 sends a notification message to the AMF device 106. For example, the SDM device 110 sends the notification message to the AMF device 106 based on the AMF ID obtained in the attach procedure. The notification message carries a cause value: a mobile terminated short message service MT-SMS, and the cause value is used to trigger the AMF device 106 to send a registration trigger request message to the SMF device.

In step 408, the AMF device obtains the SMF identification information of the SMF device (for example, the SMF device 108) capable of processing the short message service.

In step 410, the AMF device 106 sends the registration trigger request message to the SMF device 108.

In step 412, the SMF device 108 sends a registration request message to the SDM device 110, to register the short message service with the SDM device 110.

In step 414, the SMF device 108 completes registration of the short message service with the SDM device 110.

In step 416, the SDM device 110 sends a registration response message to the SMF device 108, to notify the SMF device 108 that the SMF device 108 successfully registers the short message service.

For steps 408 to 416, refer to the descriptions of steps 204 to 212 in FIG. 2. Details are not described herein again.

Optionally, the registration trigger request message in step 410 may further include a mobile terminated short message service MT-SMS indication. The indication is used to notify the SMF device 108 that the registration trigger request message is triggered by the downlink short message. Depending on whether the registration trigger request message includes the indication, subsequent steps may be implemented by using a different solution, namely, Solution A or Solution B.

In Solution A, the registration trigger request message in step 410 may include or may not include the mobile terminated short message service MT-SMS indication. The downlink short message data is sent to the terminal device 102 through steps 418 to 426, as shown in FIG. 4.

In step 418, after receiving the registration response message, the SMF device 108 directly sends a registration trigger response message to the AMF device 106, where the registration trigger response message is used to indicate that the SMF device 108 successfully registers the short message service. For example, the registration trigger response message may carry the IMSI and the SMF identification information.

After receiving the registration trigger response message, the AMF device 106 determines, based on a status of the terminal device 102, whether the terminal device 102 needs to be paged. Optionally, if the terminal device 102 is in an idle state, the AMF device 106 pages the terminal device 102 through step 419, so that the terminal device 102 enters a connected (active) state.

In step 420, the SDM device 110 sends the registered SMF identification information of the SMF device 108 to the short message center 112.

It should be noted that step 420 may be performed after, or at the same time as, or before step 418. Provided that the SDM device 110 has completed registration of the short message service through step 414, the SDM device 110 may transfer the registered SMF identification information of the SMF device 108 to the short message center at any moment through step 420.

In step 422, after receiving the SMF identification information, the short message center 112 sends the downlink short message data to the SMF device 108; and after receiving the downlink short message data, the SMF device 108 sends the downlink short message data to the AMF device 106 through step 424. In addition, the SMF device 108 may further perform short message-related charging and lawful interception functions through an API for charging.

In step 426, the AMF device 106 encapsulates the downlink short message data in a downlink NAS message, and sends the downlink NAS message to the terminal device via the access network device 104.

In addition, in step 421, the AMF device 106 obtains an association between the SMF identification information and the terminal device 102.

For step 421, refer to the description of step 216 in FIG. 2. Details are not described herein again. It should be noted that step 421 may be performed immediately after the SMF identification information is obtained in step 408; or may be performed after the registration trigger response message in step 418 is received and it is learned that the SMF device 108 has successfully registered the short message service with the SDM device 110; or may be performed at any moment between step 408 and step 418.

In Solution B, the registration trigger request message in step 410 includes the mobile terminated short message service MT-SMS indication. The downlink short message data is sent to the terminal device 102 through steps 428 to 434, as shown in FIG. 4.

In step 428, the SDM device 110 sends the registered SMF identification information of the SMF device 108 to the short message center 112.

In step 430, after receiving the SMF identification information, the short message center 112 sends the downlink short message data to the SMF device 108.

In step 432, because the registration trigger request message received by the SMF device 108 includes the mobile terminated short message service MT-SMS indication, the SMF device 108 sends a registration trigger response message to the AMF device 106 only after receiving the downlink short message data from the short message center 112, where the registration trigger response message is used to indicate that the SMF device 108 successfully registers the short message service, the registration trigger response message further carries the downlink short message data, and the registration trigger response message may further carry the IMSI and the SMF identification information. In addition, the SMF device 108 may further perform short message-related charging and lawful interception functions through the API for charging.

After receiving the registration trigger response message, the AMF device 106 determines, based on a status of the terminal device 102, whether the terminal device 102 needs to be paged. Optionally, if the terminal device 102 is in an idle state, the AMF device 106 pages the terminal device 102 through step 433, so that the terminal device 102 enters a connected state.

In step 434, the AMF device 106 encapsulates the downlink short message data in a downlink NAS message, and sends the downlink NAS message to the terminal device via the access network device 104.

In addition, in step 436, the AMF device 106 obtains an association between the SMF identification information and the terminal device 102.

For step 436, refer to the description of step 216 in FIG. 2. Details are not described herein again. It should be noted that step 436 may be performed immediately after the SMF identification information is obtained in step 408; or may be performed after the registration trigger response message in step 432 is received and it is learned that the SMF device 108 has successfully registered the short message service with the SDM device 110; or may be performed at any moment between step 408 and step 416 or between step 428 and step 432.

As described above, the example in FIG. 5 is also applicable to the scenario in which the terminal device 102 has no short message service for a relatively long period of time after being powered on and attached. The terminal device 102 does not register a short message service during an attach procedure, and a downlink short message of the terminal device 102 may trigger registration of the short message service. FIG. 5 differs from FIG. 4 in that, even if the short message center 112 has not found the routing information of the downlink short message data from the SDM device 110, the short message center 112 sends the downlink short message data to the SDM device 110 first, to cache the downlink short message data in the SDM device 110. After the SMF device 108 registers the short message service with the SDM device 110, the SDM device 110 may send the cached downlink short message data to the SMF device 108. As shown in FIG. 5, the short message transmission method includes the following steps.

In step 501, an attach procedure of the terminal device 102 is performed. In the attach procedure, because the AMF device 106 needs to register location information of the terminal device 102 with the SDM device 110, the SDM device 110 may obtain an identifier of the AMF device 106, namely, an AMF ID.

In step 502, after the arrival of the downlink short message, the short message center 112 sends a route request message of downlink short message data to the SDM device 110, to query routing information of the downlink short message data.

In step 504, the SDM device 110 determines that the SDM device 110 does not have SMF identification information of an SMF device that processes the short message service. For example, the SDM device 110 searches for a context of the terminal device 102 locally. Because the short message service has been registered with the SDM device 110, the foregoing SMF identification information does not exist in the context.

In step 506, even if the short message center 112 has not found the routing information of the downlink short message data from the SDM device 110, the short message center 112 still sends the downlink short message data to the SDM device 110 first.

In step 508, after receiving the downlink short message data, the SDM device 110 caches the downlink short message data locally.

In step 510, the SDM device 110 sends a notification message to the AMF device 106. For example, the SDM device 110 sends the notification message to the AMF device 106 based on the AMF ID obtained in the attach procedure. The notification message carries a cause value: a mobile terminated short message service MT-SMS, and the cause value is used to trigger the AMF device 106 to send a registration trigger request message to the SMF device.

It should be noted that step 510 may be performed after step 508, or may be performed before step 506 or step 508. This is not limited in this application.

In step 512, the AMF device obtains SMF identification information of an SMF device (for example, the SMF device 108) capable of processing the short message service.

In step 514, the AMF device 106 sends the registration trigger request message to the SMF device 108.

In step 516, the SMF device 108 sends a registration request message to the SDM device 110, to register the short message service with the SDM device 110.

In step 518, the SMF device 108 completes registration of the short message service with the SDM device 110.

For steps 512 to 518, refer to the descriptions of steps 204 to 210 in FIG. 2. Details are not described herein again.

In step 520, the SDM device 110 sends a registration response message to the SMF device 108, to notify the SMF device 108 that the SMF device 108 successfully registers the short message service. For example, the registration response message carries the cached downlink short message data and short message service subscription information of the terminal device 102. In addition, the registration response message may further carry the foregoing IMSI and flag bit SMS in SMF feature flag.

In step 522, the SMF device 108 sends a registration trigger response message to the AMF device 106, where the registration trigger response message is used to indicate that the SMF device 108 successfully registers the short message service, the registration trigger response message carries the downlink short message data, and the registration trigger response message may further carry the IMSI and the SMF identification information. In addition, the SMF device 108 may further perform short message-related charging and lawful interception functions through an API for charging.

After receiving the registration trigger response message, the AMF device 106 determines, based on a status of the terminal device 102, whether the terminal device 102 needs to be paged. Optionally, if the terminal device 102 is in an idle state, the AMF device 106 pages the terminal device 102 through step 523, so that the terminal device 102 enters a connected state.

In step 524, the AMF device 106 encapsulates the downlink short message data in a downlink NAS message, and sends the downlink NAS message to the terminal device via the access network device 104.

In addition, in step 526, the AMF device 106 obtains an association between the SMF identification information and the terminal device 102.

For step 526, refer to the description of step 216 in FIG. 2. Details are not described herein again. It should be noted that step 526 may be performed immediately after the SMF identification information is obtained in step 512; or may be performed after the registration trigger response message in step 526 is received and it is learned that the SMF device 108 has successfully registered the short message service with the SDM device 110; or may be performed at any moment between step 512 and step 526.

For the examples in FIG. 4 and FIG. 5, the downlink short message triggers the SMF device 108 to register the short message service with the SDM device 110. After registration is completed, the SMF identification information of the SMF device 108 that is used to route the downlink short message data is stored in the SDM device. If a downlink short message arrives at the short message center 112 subsequently, the short message center 112 may query, from the SDM device 110, routing information of the downlink short message, namely, the foregoing SMF identification information of the SMF device 108. Therefore, the short message center 112 may send the downlink short message data to the SMF device 108.

In addition, if an uplink short message arrives at the AMF device 106 subsequently, because the AMF device 106 has obtained the association between the terminal device 102 and the SMF identification information of the SMF device 108 that processes the short message service, the AMF device may directly determine, based on the SMF identification information, an SMF device that receives uplink short message data as the SMF device 108 that processes the short message service, and send the uplink short message data to the SMF device 108.

The foregoing embodiments of FIG. 2 to FIG. 5 describe a method for implementing short message transmission by using only NAS signaling. In the foregoing method, the AMF device 106 may serve as a NAS agent; and the SMF device 108 may be configured to terminate a short message service, and complete transmission of uplink and downlink short message data with the short message center 112. The SMF device 108 may have a different name in the next-generation mobile network architecture, for example, a short message function entity device. This is not limited in this application.

For example, the short message transmission method includes the following steps:

receiving, by a communications device (for example, the AMF device 106), uplink data and indication information from a terminal device (for example, the terminal device 102), where the indication information is used to indicate that the uplink data belongs to a short message service (for example, step 220 in FIG. 2 or step 302 in FIG. 3);

determining, by the communications device, identification information (for example, the foregoing SMF identification information), where the identification information is used to identify a short message function entity device (for example, the SMF device 108) that processes the short message service; and sending, by the communications device, the uplink data to the short message function entity based on the indication information and the identification information (for example, step 222 in FIG. 2 or step 318 in FIG. 3).

It should be noted that, for the step of determining identification information, if the communications device has stored the identification information, the determining may be implemented directly by using the identification information. If the communications device does not have the identification information yet, the identification information may be obtained through an additional step, to implement the determining. The communications device may first receive the uplink data and the indication information from the terminal device, and then obtain the identification information (for example, FIG. 3); or may first obtain the identification information, and then receive the uplink data and the indication information from the terminal device (for example, FIG. 2, FIG. 4, or FIG. 5). This is not limited in this application.

According to the short message transmission method in this embodiment of this application, after the uplink short message data arrives at the communications device, the communications device sends, based on the indication information and the obtained identification information, the uplink short message data to the SMF device that is capable of processing the short message service and that has completed short message service registration. In this way, uplink short message transmission is implemented in a next-generation mobile network architecture. In addition, in the short message transmission method in this embodiment of this application, the short message service registration may also be triggered by data (uplink data or downlink data). In other words, the short message service registration for the terminal is not triggered until a network needs to forward short message data, so that user context storage load on a core network can be reduced.

Optionally, the method further includes: sending, by the communications device, a first request message (for example, refer to the registration trigger request message in step 206 in FIG. 2, step 306 in FIG. 3, step 410 in FIG. 4, or step 514 in FIG. 5) to the short message function entity device; and receiving, by the communications device, a first response message (for example, refer to the registration trigger response message in step 214 in FIG. 2, step 314 in FIG. 3, step 418 or 432 in FIG. 4, or step 522 in FIG. 5) from the short message function entity device, where the first response message is used to indicate that the short message function entity device successfully registers the short message service.

Optionally, the step of determining, by the communications device, the identification information (for example, the foregoing SMF identification information) includes: obtaining, by the communications device, an association between the identification information and the terminal device (for example, refer to step 216 in FIG. 2, step 316 in FIG. 3, step 421 or 436 in FIG. 4, or step 526 in FIG. 5).

Optionally, before the sending, by the communications device, the first request message to the short message function entity device, the method further includes:

receiving, by the communications device, an attach request message from the terminal device, where the attach request message carries capability information, and the capability information is used to trigger the communications device to send the first request message (for example, refer to step 202 in FIG. 2); or after receiving the uplink data from the terminal device, determining, by the communications device, that the communications device does not have the identification information (for example, refer to step 304 in FIG. 3); or receiving, by the communications device, a notification message from an SDM device (for example, the SDM device 110), where the notification message carries a cause value: a mobile terminated short message service MT-SMS, and the cause value is used to trigger the communications device to send the first request message (for example, refer to step 406 in FIG. 4 or step 510 in FIG. 5).

Optionally, the first request message carries a mobile terminated short message service MT-SMS indication (for example, refer to step 410 corresponding to Solution B in FIG. 4).

Optionally, the first response message further carries downlink short message data (for example, refer to step 432 in FIG. 4 or step 522 in FIG. 5). Returning the downlink short message data through the first response message can reduce signaling exchange between network elements of a core network.

Optionally, the step of determining, by the communications device, the identification information includes: sending, by the communications device, a request message to a network function discovery device, where the request message carries a type of a requested network function: a short message function; and receiving, by the communications device, a response message from the network function discovery device, where the response message carries the identification information. For example, when the communications device does not have the identification information yet, the communications device may request the identification information from the network function discovery device.

Optionally, the step of determining, by the communications device, the identification information includes: searching for, by the communications device, a context of the terminal device to obtain the identification information associated with the terminal device, where the context includes the association between the terminal device and the identification information. For example, after the communications device has stored the identification information, the communications device may directly determine the identification information based on the context of the identification information.

In addition, this application further discloses a short message transmission method, including:

receiving, by a short message function entity device (for example, the SMF device 108), a first request message (for example, refer to the registration trigger request message in step 206 in FIG. 2, step 306 in FIG. 3, step 410 in FIG. 4, or step 514 in FIG. 5) from a communications device (for example, the AMF device 106);

sending, by the short message function entity device, a second request message (for example, refer to the registration request message in step 208 in FIG. 2, step 308 in FIG. 3, step 412 in FIG. 4, or step 516 in FIG. 5) to an SDM device (for example, the SDM device 110) based on the first request message, where the second request message includes identification information (for example, the foregoing SMF identification information), and the identification information is used to identify the short message function entity device that processes the short message service;

receiving, by the short message function entity device, a second response message (for example, refer to the registration response message in step 212 in FIG. 2, step 312 in FIG. 3, step 416 in FIG. 4, or step 520 in FIG. 5) from the SDM device, where the second response message carries subscription data of the short message service; and sending, by the short message function entity device, a first response message (for example, refer to the registration trigger response message in step 214 in FIG. 2, step 314 in FIG. 3, step 418 or 432 in FIG. 4, or step 522 in FIG. 5) to the communications device, where the first response message indicates that the short message function entity device successfully registers the short message service.

Optionally, the method further includes: receiving, by the short message function entity device, downlink short message data from a short message center (for example, the short message center 112) or the SDM device, where the first response message further includes the downlink short message data (for example, refer to step 432 in FIG. 4 or step 522 in FIG. 5).

In addition, this application further discloses a short message transmission method, including:

receiving, by an SDM device (for example, the SDM device 110), a route lookup request message from a short message center (for example, the short message center 112) to query identification information (for example, the foregoing SMF identification information), where the identification information is used to identify a short message function entity device (for example, the SMF device 108 in step 402 in FIG. 4 or step 502 in FIG. 5) that processes a short message service;

if the SDM device does not have the identification information, sending, by the SDM device, a notification message to a communications device (for example, the AMF device 106), where the notification message includes a cause value: a mobile terminated short message service MT-SMS, and the cause value is used to trigger the communications device to send a first request message (for example, the registration trigger request message in steps 404 and 406 in FIG. 4 or steps 504 and 510 in FIG. 5) to the short message function entity device;

receiving, by the SDM device, a second request message (for example, the registration request message in step 412 in FIG. 4 or step 516 in FIG. 5) from the short message function entity device, where the second request message includes the identification information; and sending, by the SDM device, a second response message (for example, the registration response message in step 416 in FIG. 4 or step 520 in FIG. 5) to the short message function entity device, where the second response message carries subscription data of the short message service.

Optionally, the method further includes: sending, by the SDM device, the identification information to the SMC (for example, step 420 or 428 in FIG. 4).

Optionally, after the SDM device receives the route lookup request message from the SMC, the method further includes: receiving, by the SDM device, downlink short message data from the SMC, where the second response message carries the downlink short message data (for example, steps 506 and 520 in FIG. 5).

In addition, this application further discloses a short message transmission method, including:

sending, by a terminal device (for example, the terminal device 102), uplink data and indication information to a communications device (for example, the AMF device 106), where the indication information is used to indicate that the uplink data belongs to a short message service (for example, step 220 in FIG. 2 or step 302 in FIG. 3).

Optionally, the method further includes:

sending, by the terminal device, an attach request message to the communications device, where the attach request message carries capability information, and the capability information is used to trigger the communications device to send the first request message, thereby triggering registration of the short message service (for example, refer to step 202 in FIG. 2).

Figure 6:
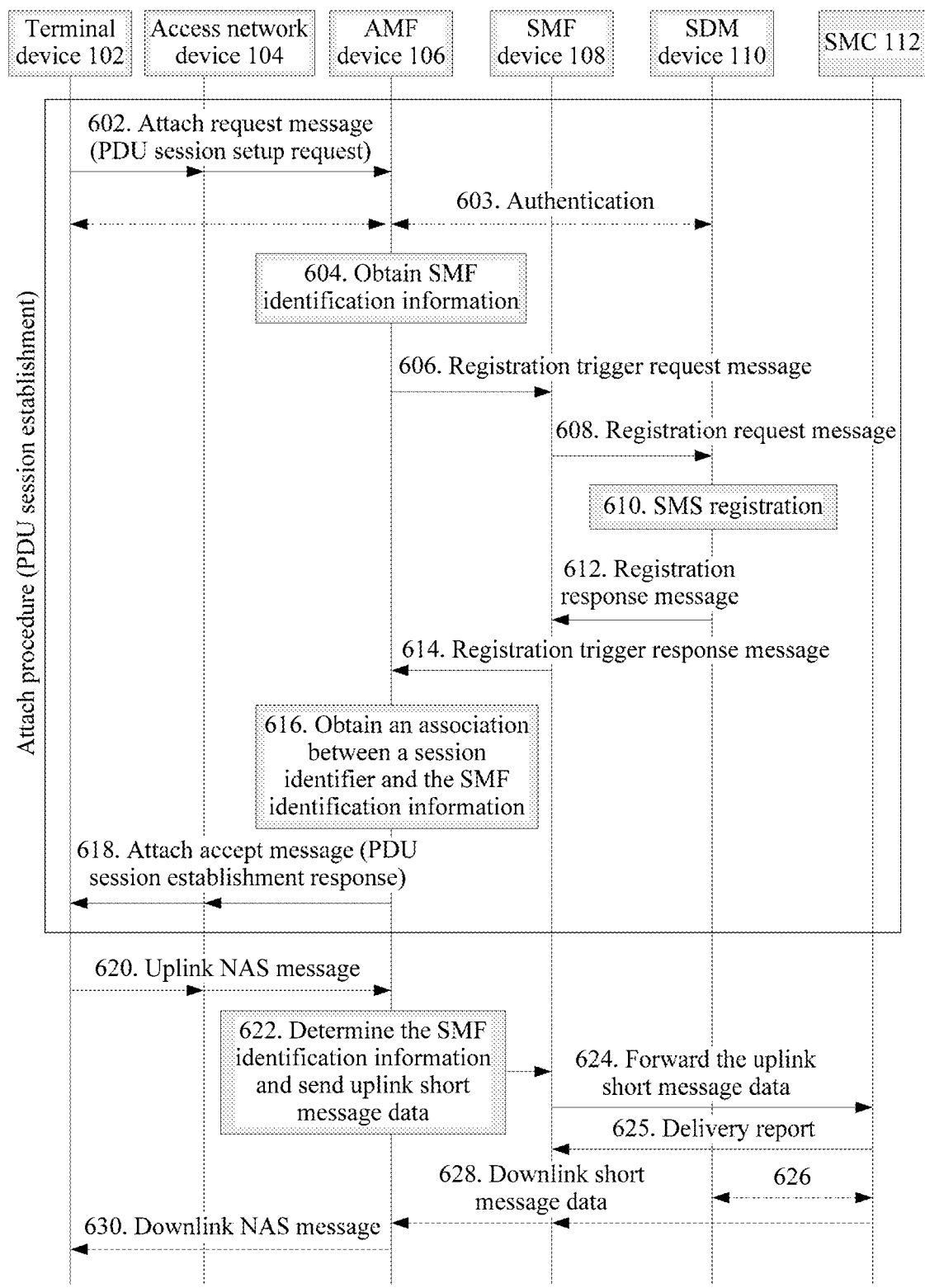
Figure 7:
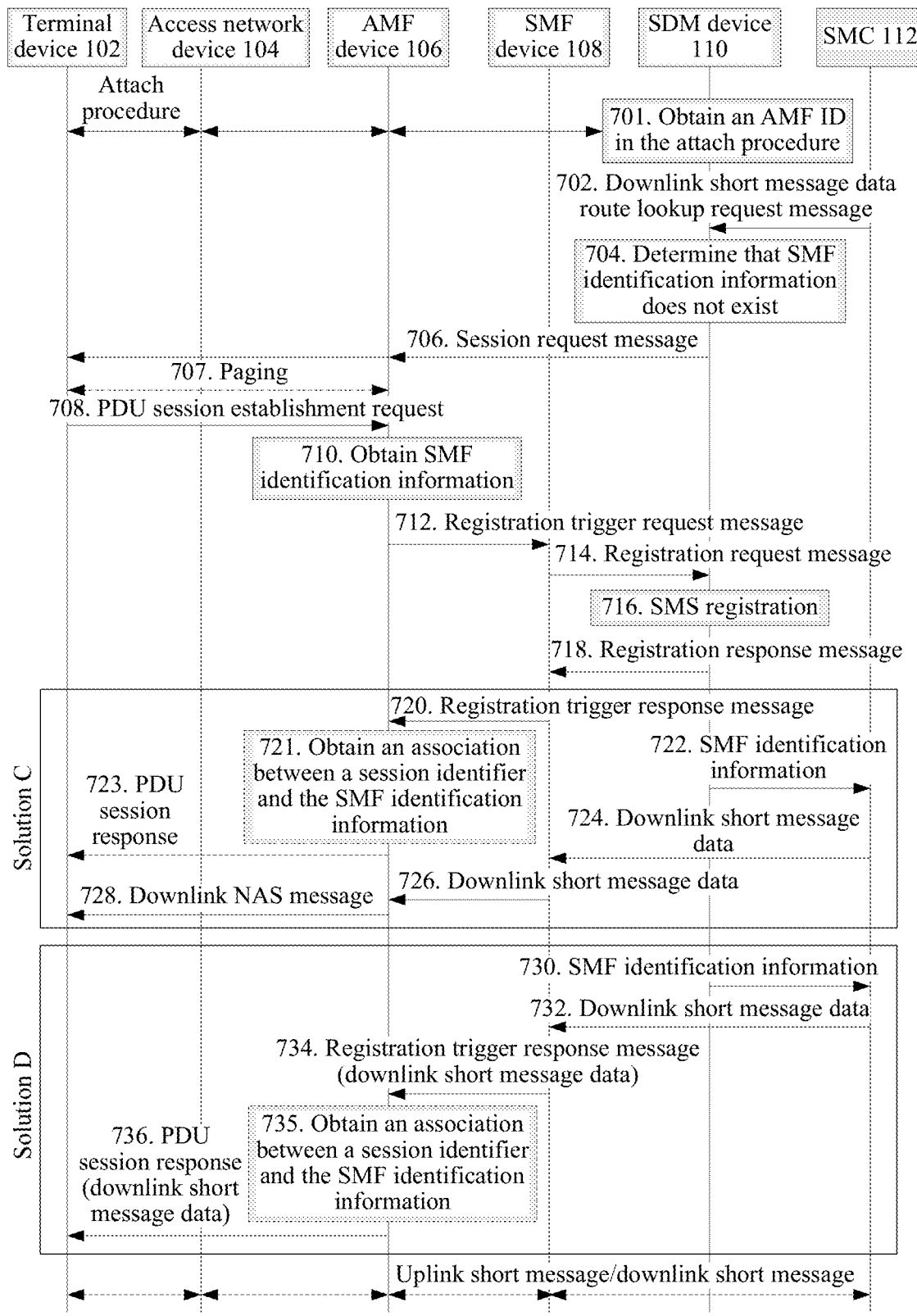
Figure 8:
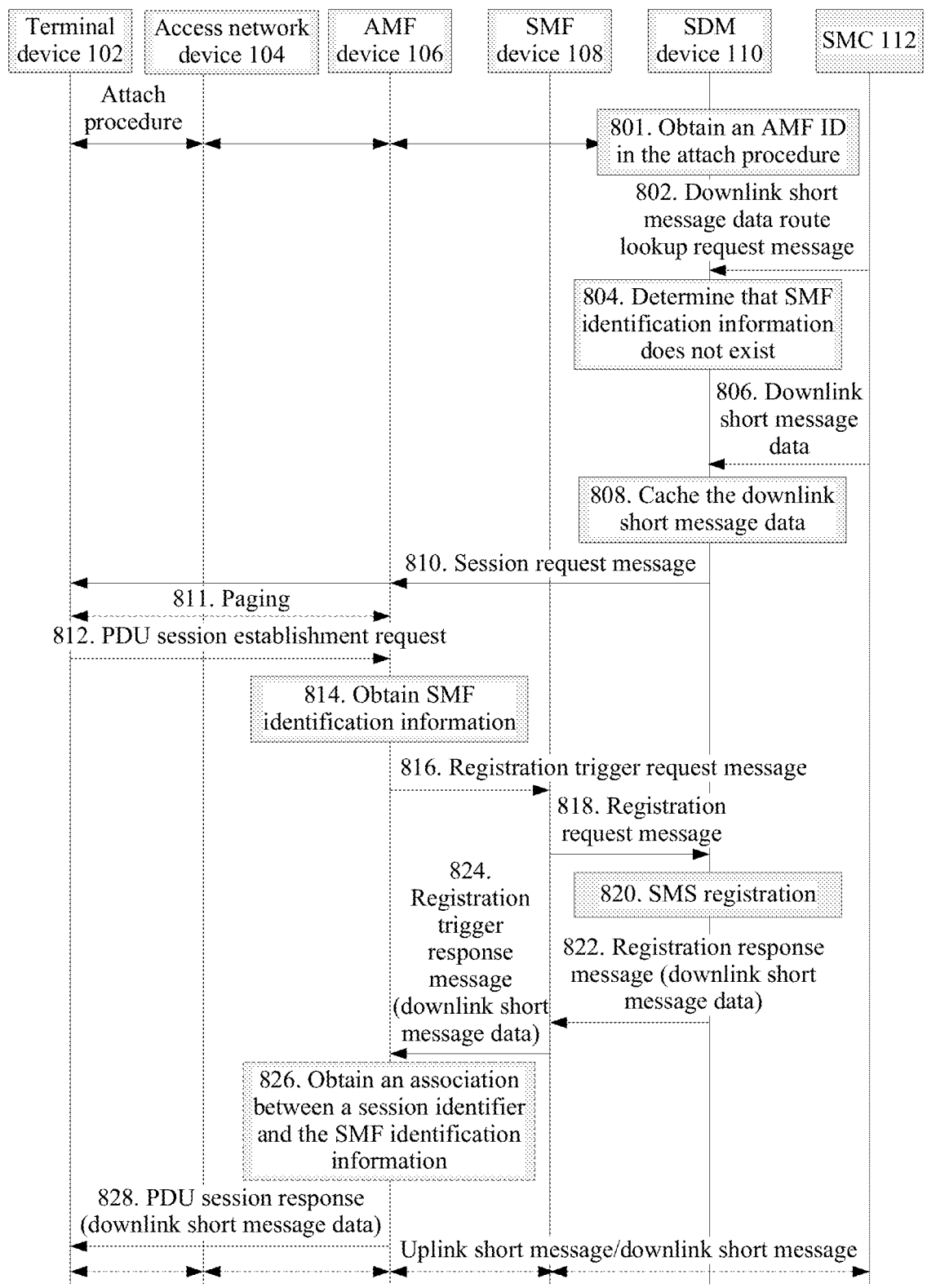

FIG. 6 to FIG. 8 are schematic flowcharts of a short message transmission method using a session according to an embodiment of this application. In an example in FIG. 6, the terminal device 102 adds, to an attach request, a data network name (DNN) of a short message service and a session identifier of a session for processing the short message service. After receiving the attach request, the AMF device 106 determines the SMF device 108 capable of processing the short message service for the terminal device 102, to trigger the SMF device 108 to register the short message service with the SDM device 110. In other words, a short message service registration process may be implemented in an attach procedure of the terminal device 102. In addition, a session for the short message service may be established in the attach procedure. In examples in FIG. 7 and FIG. 8, a short message service is not registered in an attach procedure of the terminal device 102; and after a downlink short message (MT SM) arrives at the short message center 112, the SDM device 110 triggers, based on an identifier of the AMF device 106 stored in the attach procedure, the AMF device 106 to determine the SMF device 108 capable of processing a short message service for the terminal device 102, to trigger the SMF device 108 to register the short message service with the SDM device 110.

FIG. 7 and FIG. 8 are both applicable to the scenario in which the terminal device 102 has no short message service for a relatively long period of time after being powered on and attached. For example, in some actual scenarios, even if the terminal device 102 attaches to a network, a mobile originated short message service may be used infrequently. With the emergence of more applications, verification of a user identity by obtaining a short message verification code as a dynamic password to log in to an application or website account gradually becomes popular, and short message subscription (for example, for bank card balance notifications) is also quite common in daily life. In this behavior pattern, the terminal device 102 does not actively initiate transmission of a short message service, but receives some short message notification information (for example, service short messages about a weather forecast, an insufficient balance, and the like) from a website or an operator. In this scenario, a registration procedure of a short message service may be triggered by a downlink short message.

For example, in the example in FIG. 6, the short message transmission method includes the following steps.

In step 602, the terminal device 102 sends an attach request message to the AMF device 106 via the access network device 104, where the attach request message further carries a packet data unit (PDU) session establishment request. For example, the attach request message carries a data network name (DNN) of the short message service: DNN (SMS) and a session identifier (session ID) allocated by the terminal device 102 to the short message service. The session identifier is used to identify a session for processing the short message service, to trigger a core network side to establish, for the terminal device 102, a session for the short message service. In addition, the attach request message may further carry an IMSI used to identify the terminal device 102.

For example, the attach request message may be a mobility management NAS (MM NAS) message or a session management NAS (SM NAS) message. The MM NAS message includes the IMSI and the DNN (SMS) of the short message service; and the SM NAS message (may be used as the PDU session establishment request) carries the session identifier.

In step 604, the AMF device 106 obtains, based on the DNN, SMF identification information of an SMF device (for example, the SMF device 108) capable of processing the short message service.

For example, the AMF device 106 learns, based on the DNN (SMS) in the MM NAS message, that the terminal device 102 processes the short message service, and sends a request message to a network function discovery device (for example, a DNS or NRF). The request message carries the DNN and a type of a requested network function: a short message function.

After receiving the request message, the network function discovery device selects, based on the DNN, the SMF device (for example, the SMF device 108) capable of processing the short message service, and returns a response message carrying the SMF identification information to the AMF device. The SMF identification information is used to identify the SMF device 108 that processes the short message service. For example, the SMF identification information includes an identifier ID or address of the SMF device that processes the short message service. Optionally, the SMF address may be used to route only uplink short message data, or route both uplink short message data and downlink short message data.

Optionally, before step 604, the AMF device 106 may obtain subscription information of the terminal device 102 from the SDM device 110 through step 603, to authenticate the terminal device 102. The AMF device 106 obtains the SMF identification information for the terminal device 102 only after the terminal device 102 is authenticated.

In step 606, the AMF device 106 sends a registration trigger request message to the SMF device 108, where the registration trigger request message may carry the DNN and the session identifier, and the registration trigger request message may further carry the IMSI and an identifier of the AMF device 106. For example, the AMF device 106 adds the IMSI, the identifier of the AMF device 106, and the DNN to the SM NAS message containing the session identifier, and forwards the new SM NAS message as the registration trigger request message to the SMF device 108.

In step 608, the SMF device 108 sends a registration request message to the SDM device 110, to register the short message service with the SDM device 110. For example, the registration request message carries the SMF identification information used to route downlink short message data. For example, the registration request message may carry the SMF identification information received in step 606: the ID or address of the SMF device. Optionally, the SMF device 108 may allocate a dedicated SMF address for routing a downlink short message, and send the dedicated SMF address as the SMF identification information to the SDM device 110. In addition, the registration request message may further carry the IMSI and a flag bit (SMS in SMF feature flag) for the SMF to process the short message service.

In step 610, the SMF device 108 completes registration of the short message service with the SDM device 110. For example, the SDM device 110 may store the SMF identification information in the registration request message to route the downlink short message data, thereby implementing the registration of the short message service by the SMF device 108. In addition, the SDM device 110 may further store the foregoing flag bit SMS in SMF feature flag.

In step 612, the SDM device 110 sends a registration response message to the SMF device 108, to notify the SMF device 108 that the SMF device 108 successfully registers the short message service. For example, the registration response message may carry short message service subscription information of the terminal device 102. In addition, the registration response message may further carry the foregoing IMSI and flag bit SMS in SMF feature flag.

In step 614, the SMF device 108 sends a registration trigger response message to the AMF device 106, where the registration trigger response message is used to indicate that the SMF device 108 successfully registers the short message service. For example, the registration trigger response message may carry the IMSI, the SMF identification information, and the foregoing session identifier.

In step 616, the AMF device 106 obtains an association between the SMF identification information and the session identifier. For example, the AMF device 106 may store the obtained association between the identification information and the session identifier in a context of the terminal device 102.

It should be noted that step 616 may be performed immediately after the SMF identification information is obtained in step 604; or may be performed after the registration trigger response message in step 614 is received and it is learned that the SMF device 108 has successfully registered the short message service with the SDM device 110; or may be performed at any moment between step 604 and step 614.

In step 618, the AMF device 106 sends an attach accept message to the terminal device 102 via the access network device 104, and completes an attach procedure, where the attach accept message may carry a temporary identifier ID allocated to the terminal device 102, and the attach accept message may further carry a PDU session establishment response.

In step 620, the terminal device 102 encapsulates uplink short message data in an uplink NAS message, and sends the uplink NAS message to the AMF device 106 via the access network device 104, where the NAS message includes uplink data and the session identifier, and the session identifier is used to identify the session for processing the short message service. In addition, the uplink NAS message may further carry the temporary identifier of the terminal device 102, current UE location information, a calling number, a called number, and the like.

In step 622, the AMF device 106 determines, based on the SMF identification information associated with the session identifier, the SMF identification information of the SMF device (the SMF device 108) capable of processing the short message service; and sends the uplink short message data to the SMF device 108.

For example, the AMF device 106 searches the context of the terminal device 102 for the SMF identification information associated with the session identifier in the uplink NAS message; determines that an SMF device configured to process the uplink NAS message is the SMF device 108; and then sends the uplink short message data to the SMF device 108. Optionally, after receiving the uplink NAS message, the AMF device 106 first performs integrity check. The AMF device 106 sends the uplink short message data to the SMF device 108 only if the integrity check succeeds.

In step 624, after receiving the uplink short message data, the SMF device 108 forwards the uplink short message data to the short message center 112. For example, the SMF device 108 sends, based on the calling number, the uplink short message data to a short message center to which the terminal device 102 belongs. In addition, the SMF device 108 may further perform short message-related charging and lawful interception functions through an API for charging.

Because the session for the short message service is established in the attach procedure, the uplink short message data may be transferred between the terminal device 102 and the AMF device 106 and between the AMF device 106 and the SMF device 108 through the session.

In step 625, after receiving the uplink short message data from the SMF device 108, the short message center 112 authenticates a calling user number segment, and returns a delivery report of declining or accepting.

According to the short message transmission method in this embodiment of this application, the SMF device 108 registers the short message service with the SDM device 110 in the attach procedure and establishes a PDU session dedicated for the short message service. In addition, the AMF device 106 associates the identification information of the SMF device capable of processing the short message service with the session identifier of the PDU session. After the uplink NAS message carrying the uplink short message data arrives at the AMF device, the AMF device determines, based on the session identifier in the uplink NAS message, the SMF identification information associated with the session identifier, to send the uplink short message data to the SMF device that is capable of processing the short message service and that has completed short message service registration. In this way, uplink short message transmission is implemented in a next-generation mobile network architecture.

In addition, the SMF device 108 having the session attribute can maintain sessions of all services. As one of the services, the short message service has a dedicated session, so that the SMF device 108 can maintain the session conveniently to implement short message transmission.

The AMF device addresses the SMF device based on a session identifier carried in an uplink short message packet, thereby keeping consistent with a routing mechanism of another session.

In addition, because the SMF device 108 may further perform the short message-related charging and lawful interception functions through the API for charging, no additional API for charging is needed, and interface resources of the SMF device can be saved.

In addition, when a downlink short message arrives at the short message center 112, downlink short message transmission may be implemented through steps 626 to 630.

In step 626, the short message center 112 requests, from the SDM device 110, the identification information (for example, the ID or address of the SMF device 108) of the SMF device that is used to route the downlink short message. Because the identification information of the SMF device 108 has been registered in the SDM device 110, the SDM device 110 feeds back the identification information of the SMF device 108 that may be configured to route the downlink short message.

In step 628, the short message center 112 sends the downlink short message data to the SMF device 108; and after receiving the downlink short message data, the SMF device 108 sends the downlink short message data to the AMF device 106. In addition, the SMF device 108 may further perform short message-related charging and lawful interception functions through the API for charging.

In step 630, the AMF device 106 encapsulates the downlink short message data in a downlink NAS message, and sends the downlink NAS message to the terminal device via the access network device 104.

Because the session for the short message service is established in the attach procedure, the downlink short message data may be transferred between the terminal device 102 and the AMF device 106 and between the AMF device 106 and the SMF device 108 through the session.

As described above, the example in FIG. 7 is applicable to the scenario in which the terminal device 102 has no short message service for a relatively long period of time after being powered on and attached. The terminal device 102 does not register a short message service during an attach procedure, and a downlink short message of the terminal device 102 may trigger registration of the short message service. As shown in FIG. 7, the short message transmission method includes the following steps.

In step 701, an attach procedure of the terminal device 102 is performed. In the attach procedure, because the AMF device 106 needs to register location information of the terminal device 102 with the SDM device 110, the SDM device 110 may obtain an identifier of the AMF device 106, namely, an AMF ID.

In step 702, after the arrival of the downlink short message, the short message center 112 sends a route request message of downlink short message data to the SDM device 110, to query routing information of the downlink short message data.

In step 704, the SDM device 110 determines that the SDM device 110 does not have SMF identification information of an SMF device that processes the short message service. For example, the SDM device 110 searches for a context of the terminal device 102 locally. Because the short message service has been registered with the SDM device 110, the foregoing SMF identification information does not exist in the context.

In step 706, after determining that the SMF identification information does not exist, the SDM device 110 sends a session request message to the AMF device 106. For example, the SDM device 110 sends the session request message to the AMF device 106 based on the AMF ID obtained in the attach procedure. The session request message carries a DNN of the short message service: DNN (SMS). The DNN (SMS) is used to trigger establishment of a PDU session for the short message service. In addition, the session request message may further carry an IMSI used to identify the terminal device 102.

After receiving the session request message, the AMF device 106 forwards the session request message to the terminal device 102.

Optionally, after receiving the session request message, the AMF device 106 determines, based on a status of the terminal device 102, whether the terminal device 102 needs to be paged. Optionally, if the terminal device 102 is in an idle state, the AMF device 106 sends a paging message to the terminal device 102 through step 707, so that the terminal device 102 enters a connected (active) state. Optionally, the paging message carries a cause value: a mobile terminated short message service MT-SMS, and the paging message is used to trigger context setup of a session for the short message service.

In step 708, after receiving the session request message, the terminal device 102 sends a PDU session establishment request to the AMF device 106. For example, the PDU session establishment request carries a DNN of the short message service: DNN (SMS) and a session identifier allocated by the terminal device 102 to the short message service. The session identifier is used to identify a session for processing the short message service, to trigger a core network side to establish, for the terminal device 102, a session for the short message service. In addition, the PDU session establishment request may further carry an IMSI used to identify the terminal device 102.

For example, the PDU session establishment request may be an MM NAS message or an SM NAS message. The MM NAS message includes the IMSI and the DNN (SMS) of the short message service; and the SM NAS message carries the foregoing session identifier.

In step 710, the AMF device 106 obtains SMF identification information of an SMF device (for example, the SMF device 108) capable of processing the short message service.

In step 712, the AMF device 106 sends a registration trigger request message to the SMF device 108.

In step 714, the SMF device 108 sends a registration request message to the SDM device 110, to register the short message service with the SDM device 110.

In step 716, the SMF device 108 completes registration of the short message service with the SDM device 110.

In step 718, the SDM device 110 sends a registration response message to the SMF device 108, to notify the SMF device 108 that the SMF device 108 successfully registers the short message service.

For steps 710 to 718, refer to the descriptions of steps 604 to 612 in FIG. 6. Details are not described herein again.

Optionally, the registration trigger request message in step 712 may further include a mobile terminated short message service MT-SMS indication. The indication is used to notify the SMF device 108 that the registration trigger request message is triggered by the downlink short message. Depending on whether the registration trigger request message includes the indication, subsequent steps may be implemented by using a different solution, namely, Solution C or Solution D.

In Solution C, the registration trigger request message in step 712 may include or may not include the mobile terminated short message service MT-SMS indication. The downlink short message data is sent to the terminal device 102 through steps 720 to 728, as shown in FIG. 7.

In step 720, after receiving the registration response message, the SMF device 108 directly sends a registration trigger response message to the AMF device 106, where the registration trigger response message is used to indicate that the SMF device 108 successfully registers the short message service. For example, the registration trigger response message may carry the IMSI, the SMF identification information, and the session identifier.

In step 722, the SDM device 110 sends the registered SMF identification information of the SMF device 108 to the short message center 112.

It should be noted that step 722 may be performed after, or at the same time as, or before step 720. Provided that the SDM device 110 has completed registration of the short message service through step 716, the SDM device 110 may transfer the registered SMF identification information of the SMF device 108 to the short message center at any moment through step 722.

In step 724, after receiving the SMF identification information, the short message center 112 sends the downlink short message data to the SMF device 108; and after receiving the downlink short message data, the SMF device 108 sends the downlink short message data to the AMF device 106 through step 726. In addition, the SMF device 108 may further perform short message-related charging and lawful interception functions through an API for charging.

In step 728, the AMF device 106 encapsulates the downlink short message data in a downlink NAS message, and sends the downlink NAS message to the terminal device via the access network device 104.

In addition, in step 721, the AMF device 106 obtains an association between the SMF identification information and the session identifier.

For step 721, refer to the description of step 616 in FIG. 6. Details are not described herein again. It should be noted that step 721 may be performed immediately after the SMF identification information is obtained in step 710; or may be performed after the registration trigger response message in step 720 is received and it is learned that the SMF device 108 has successfully registered the short message service with the SDM device 110; or may be performed at any moment between step 710 and step 720.

In step 723, the AMF device 106 returns a PDU session response to the terminal device 102.

In Solution D, the registration trigger request message in step 712 includes the mobile terminated short message service MT-SMS indication. The downlink short message data is sent to the terminal device 102 through steps 730 to 736, as shown in FIG. 4.

In step 730, the SDM device 110 sends the registered SMF identification information of the SMF device 108 to the short message center 112.

In step 732, after receiving the SMF identification information, the short message center 112 sends the downlink short message data to the SMF device 108.

In step 734, because the registration trigger request message received by the SMF device 108 includes the mobile terminated short message service MT-SMS indication, the SMF device 108 sends a registration trigger response message to the AMF device 106 only after receiving the downlink short message data from the short message center 112, where the registration trigger response message is used to indicate that the SMF device 108 successfully registers the short message service, the registration trigger response message further carries the downlink short message data, and the registration trigger response message may further carry the IMSI, the SMF identification information, and the session identifier. In addition, the SMF device 108 may further perform short message-related charging and lawful interception functions through the API for charging.

In step 736, the AMF device 106 encapsulates the downlink short message data in a NAS message of the PDU session response, and sends the NAS message to the terminal device via the access network device 104.

In addition, in step 735, the AMF device 106 obtains an association between the SMF identification information and the session identifier.

For step 735, refer to the description of step 616 in FIG. 6. Details are not described herein again. It should be noted that step 735 may be performed immediately after the SMF identification information is obtained in step 710; or may be performed after the registration trigger response message in step 734 is received and it is learned that the SMF device 108 has successfully registered the short message service with the SDM device 110; or may be performed after step 736; or may be performed at any moment between step 710 and step 718 or between step 730 and step 734.

As described above, the example in FIG. 8 is also applicable to the scenario in which the terminal device 102 has no short message service for a relatively long period of time after being powered on and attached. The terminal device 102 does not register a short message service during an attach procedure, and a downlink short message of the terminal device 102 may trigger registration of the short message service. FIG. 8 differs from FIG. 7 in that, even if the short message center 112 has not found the routing information of the downlink short message data from the SDM device 110, the short message center 112 still sends the downlink short message data to the SDM device 110 first, to cache the downlink short message data in the SDM device 110. After the SMF device 108 registers the short message service with the SDM device 110, the SDM device 110 may send the cached downlink short message data to the SMF device 108. As shown in FIG. 8, the short message transmission method includes the following steps.

In step 801, an attach procedure of the terminal device 102 is performed. In the attach procedure, because the AMF device 106 needs to register location information of the terminal device 102 with the SDM device 110, the SDM device 110 may obtain an identifier of the AMF device 106, namely, an AMF ID.

In step 802, after the arrival of the downlink short message, the short message center 112 sends a route request message of downlink short message data to the SDM device 110, to query routing information of the downlink short message data.

In step 804, the SDM device 110 determines that the SDM device 110 does not have SMF identification information of an SMF device that processes the short message service. For example, the SDM device 110 searches for a context of the terminal device 102 locally. Because the short message service has been registered with the SDM device 110, the foregoing SMF identification information does not exist in the context.

In step 806, even if the short message center 112 has not found the routing information of the downlink short message data from the SDM device 110, the short message center 112 still sends the downlink short message data to the SDM device 110 first.

In step 808, after receiving the downlink short message data, the SDM device 110 caches the downlink short message data locally.

In step 810, the SDM device 110 sends a session request message to the AMF device 106. After receiving the session request message, the AMF device 106 forwards the session request message to the terminal device 102.

It should be noted that step 810 may be performed after step 808, or may be performed before step 806 or step 808. This is not limited in this application.

Optionally, after receiving the session request message, the AMF device 106 determines, based on a status of the terminal device 102, whether the terminal device 102 needs to be paged. Optionally, if the terminal device 102 is in an idle state, the AMF device 106 sends a paging message to the terminal device 102 through step 811, so that the terminal device 102 enters a connected state.

In step 812, after receiving the session request message, the terminal device 102 sends a PDU session establishment request to the AMF device 106.

In step 814, the AMF device 106 obtains SMF identification information of an SMF device (for example, the SMF device 108) capable of processing the short message service.

In step 816, the AMF device 106 sends a registration trigger request message to the SMF device 108.

In step 818, the SMF device 108 sends a registration request message to the SDM device 110, to register the short message service with the SDM device 110.

In step 820, the SMF device 108 completes registration of the short message service with the SDM device 110.

For steps 810 to 820, refer to descriptions of steps 706 to 716 in FIG. 7. Details are not described herein again.

In step 822, the SDM device 110 sends a registration response message to the SMF device 108, to notify the SMF device 108 that the SMF device 108 successfully registers the short message service. For example, the registration response message carries the cached downlink short message data and short message service subscription information of the terminal device 102. In addition, the registration response message may further carry the foregoing IMSI and flag bit SMS in SMF feature flag.

In step 824, the SMF device 108 sends a registration trigger response message to the AMF device 106, where the registration trigger response message is used to indicate that the SMF device 108 successfully registers the short message service, the registration trigger response message carries the downlink short message data, and the registration trigger response message may further carry the IMSI, the SMF identification information, and the session identifier. In addition, the SMF device 108 may further perform short message-related charging and lawful interception functions through an API for charging.

In step 828, the AMF device 106 encapsulates the downlink short message data in a NAS message of a PDU session response, and sends the NAS message to the terminal device via the access network device 104.

In addition, in step 826, the AMF device 106 obtains an association between the SMF identification information and the session identifier.

For step 826, refer to the description of step 616 in FIG. 6. Details are not described herein again. It should be noted that step 826 may be performed immediately after the SMF identification information is obtained in step 814; or may be performed after the registration trigger response message in step 824 is received and it is learned that the SMF device 108 has successfully registered the short message service with the SDM device 110; or may be performed after step 828; or may be performed at any moment between step 814 and step 828.

For the examples in FIG. 7 and FIG. 8, the downlink short message triggers the SMF device 108 to register the short message service with the SDM device 110. After registration is completed, the SMF identification information of the SMF device 108 that is used to route the downlink short message data is stored in the SDM device. If a downlink short message arrives at the short message center 112 subsequently, the short message center 112 may query, from the SDM device 110, routing information of the downlink short message, namely, the foregoing SMF identification information of the SMF device 108. Therefore, the short message center 112 may send the downlink short message data to the SMF device 108. Because the session for the short message service is established in the attach procedure, the downlink short message data may be transferred between the terminal device 102 and the AMF device 106 and between the AMF device 106 and the SMF device 108 through the session.

In addition, if an uplink short message arrives at the AMF device 106 subsequently, because the AMF device 106 has obtained the association between the session identifier and the SMF identification information of the SMF device 108 that processes the short message service, the AMF device may directly determine, based on the SMF identification information associated with the session identifier, an SMF device that receives uplink short message data as the SMF device 108 that processes the short message service, and send the uplink short message data to the SMF device 108. Similarly, the uplink short message data may be transferred between the terminal device 102 and the AMF device 106 and between the AMF device 106 and the SMF device 108 through the session.

The foregoing embodiments of FIG. 6 to FIG. 8 describe the method for implementing short message transmission by using a session. In the foregoing method, the AMF device 106 may serve as a NAS agent; and the SMF device 108 may be configured to terminate a short message service, and complete transmission of uplink and downlink short message data with the short message center 112. The SMF device 108 may have a different name in the next-generation mobile network architecture, for example, a short message function entity device. This is not limited in this application.

For example, the short message transmission method includes the following steps:

receiving, by a communications device (for example, the AMF device 106), uplink data and a session identifier from a terminal device (for example, the terminal device 102), where the session identifier is used to identify a session for processing a short message service;

determining, by the communications device, identification information (for example, the foregoing SMF identification information) associated with the session identifier, where the identification information is used to identify a short message function entity device (for example, the SMF device 108) that processes the short message service; and sending, by the communications device, the uplink data to the short message function entity device based on the identification information associated with the session identifier.

It should be noted that, for the step of determining identification information associated with the session identifier, if the communications device has stored the identification information associated with the session identifier, the determining may be implemented directly by using the identification information. If the communications device does not have the identification information associated with the session identifier yet, the identification information associated with the session identifier may be obtained through an additional step, to implement the determining. The communications device may first receive the uplink data and the session identifier from the terminal device, and then obtain an association between the session identifier and the identification information; or may first obtain an association between the session identifier and the identification information, and then receive the uplink data and the session identifier from the terminal device. This is not limited in this application.

According to the short message transmission method in this embodiment of this application, after the uplink short message data arrives at the communications device, the communications device sends, based on the session identifier, the uplink short message data to the SMF device that is capable of processing the short message service and that has completed short message service registration. In this way, uplink short message transmission is implemented in a next-generation mobile network architecture. In addition, registration of the short message service may be triggered by a service. To be specific, when uplink data or downlink data of the terminal arrives at a core network and needs to be forwarded, the core network determines an identifier of the short message function entity device, and triggers the short message function entity device to register the short message service, thereby registering the short message service as required, and reducing context storage load on the core network.

Optionally, the method further includes: sending, by the communications device, a first request message (for example, refer to the registration trigger request message in step 606 in FIG. 6, step 712 in FIG. 7, or step 816 in FIG. 8) to the short message function entity device, where the first request message carries a DNN of the short message service and the session identifier; and receiving, by the communications device, a first response message (for example, refer to the registration trigger response message in step 614 in FIG. 6, steps 720 and 734 in FIG. 7, or step 824 in FIG. 8) from the short message function entity device, where the first response message is used to indicate that the short message function entity device successfully registers the short message service.

Optionally, before the sending, by the communications device, the first request message to the short message function entity device, the method further includes:

receiving, by the communications device, an attach request message from the terminal device, where the attach request message carries the DNN and the session identifier (for example, refer to step 602 in FIG. 6); or receiving, by the communications device, a session request message from an SDM device (for example, the SDM device 110), where the session request message carries the DNN; and obtaining the session identifier in a session establishment process (for example, refer to steps 706 to 708 in FIG. 7 or steps 810 to 812 in FIG. 8).

Optionally, the first request message carries a mobile terminated short message service MT-SMS indication (for example, refer to step 712 corresponding to Solution D in FIG. 7).

Optionally, the first response message further carries downlink short message data (for example, step 734 in FIG. 7 or step 824 in FIG. 8). Returning the downlink short message data through the first response message can reduce signaling exchange between network elements of a core network.

Optionally, if the terminal device is in an idle state, the method further includes: sending, by the communications device, a paging message to the terminal device, where the paging message carries a cause value: a mobile terminated short message service MT-SMS, and the paging message is used to trigger context setup of a session for the short message service (for example, refer to step 707 in FIG. 7 or step 811 in FIG. 8).

Optionally, the step of determining, by the communications device, the identification information associated with the session identifier includes: sending, by the communications device, a request message to a network function discovery device, where the request message carries the DNN and a type of a requested network function: a short message function; receiving, by the communications device, a response message from the network function discovery device, to obtain the identification information, where the response message carries the identification information; and associating, by the communications device, the identification information with the session identifier. For example, when the communications device does not have the identification information yet, the communications device may request the identification information from the network function discovery device.

Optionally, the step of determining, by the communications device, the identification information associated with the session identifier includes: searching for, by the communications device, a context of the terminal device to obtain the identification information associated with the session identifier, where the context includes an association between the session identifier and the identification information. For example, after the communications device has stored the identification information associated with the session identifier, the communications device may directly determine the identification information based on the context of the identification information.

Optionally, the communications device may send uplink short message data or downlink short message data through the session for the short message.

In addition, this application further discloses a short message transmission method, including:

receiving, by a short message function entity device (for example, the SMF device 108), a first request message (for example, refer to the registration trigger request message in step 606 in FIG. 6, step 712 in FIG. 7, or step 816 in FIG. 8) from a communications device (for example, the AMF device 106), where the first request message carries a DNN of a short message service and a session identifier, and the session identifier is used to indicate a session for the short message service;

sending, by the short message function entity device, a second request message (for example, refer to the registration request message in step 608 in FIG. 6, step 714 in FIG. 7, or step 818 in FIG. 8) to an SDM device (for example, the SDM device 110) based on the first request message, where the second request message includes identification information (for example, the foregoing SMF identification information), and the identification information is used to identify the short message function entity device that processes the short message service;

receiving, by the short message function entity device, a second response message (for example, refer to the registration response message in step 612 in FIG. 6, step 718 in FIG. 7, or step 822 in FIG. 8) from the SDM device, where the second response message carries subscription data of the short message service; and sending, by the short message function entity device, a first response message (for example, refer to the registration trigger response message in step 614 in FIG. 6, steps 720 and 734 in FIG. 7, or step 824 in FIG. 8) to the communications device, where the first response message indicates that the short message function entity device successfully registers the short message service.

Optionally, the method further includes: receiving, by the short message function entity device, downlink short message data from a short message center (for example, the short message center 112) or the SDM device, where the first response message further includes the downlink short message data (for example, refer to step 734 in FIG. 7 or step 824 in FIG. 8).

Optionally, the short message function entity device may transmit uplink short message data or a downlink short message data through the session for the short message.

In addition, this application further discloses a short message transmission method, including:

receiving, by an SDM device (for example, the SDM device 110), a route lookup request message from a short message center (for example, the short message center 112) to query identification information (for example, the foregoing SMF identification information), where the identification information is used to identify a short message function entity device (for example, the SMF device 108 in step 702 in FIG. 7 or step 802 in FIG. 8) that processes a short message service;

if the SDM device does not have the identification information, sending, by the SDM device, a session request message to a communications device (for example, the AMF device 106), where the session request message carries a DNN of the short message service, and the session request message is used to trigger establishment of a session for the short message service (for example, steps 704 and 706 in FIG. 7 or steps 804 and 810 in FIG. 8);

receiving, by the SDM device, a second request message (for example, the registration request message in step 714 in FIG. 7 or step 818 in FIG. 8) from the short message function entity device, where the second request message includes the identification information; and sending, by the SDM device, a second response message (for example, the registration response message in step 718 in FIG. 7 or step 822 in FIG. 8) to the short message function entity device, where the second response message carries subscription data of the short message service.

Optionally, the method further includes: sending, by the SDM device, the identification information to the SMC (for example, step 722 or 730 in FIG. 7).

Optionally, after the SDM device receives the route lookup request message from the SMC, the method further includes: receiving, by the SDM device, downlink short message data from the SMC, where the second response message carries the downlink short message data (for example, steps 806 and 822 in FIG. 8).

In addition, this application further discloses a short message transmission method, including:

sending, by a terminal device (for example, the terminal device 102), uplink data and a session identifier to a communications device (for example, the AMF device 106), where the session identifier is used to identify a session for processing a short message service (for example, step 620 in FIG. 6).

Optionally, the method further includes:

sending, by the terminal device, an attach request message to the communications device, where the attach request message carries a DNN of the short message service and the session identifier, thereby triggering registration of the short message service (for example, refer to step 602 in FIG. 6).

In the foregoing embodiments provided in this application, the solutions such as the short message transmission method provided in the embodiments of this application are described from the perspectives of network elements and interaction between the network elements. It should be understood that, to implement the foregoing functions, each network element, for example, the communications device, the short message function entity device, the subscriber data management device, or the terminal device, includes a corresponding hardware structure and/or a software module for performing each function. A person skilled in the art should be easily aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9A:
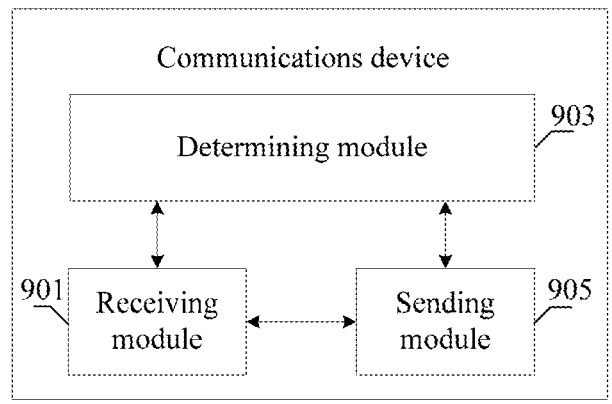
FIG. 9A and FIG. 9B are two schematic structural diagrams of a communications device according to an embodiment of this application.

For example, when the foregoing network elements implement corresponding functions by using software modules, the communications device may include a receiving module 901, a determining module 903, and a sending module 905, as shown in FIG. 9A. For example, the communications device may be implemented by the AMF device 106.

In an embodiment, the receiving module 901 is configured to receive uplink data and indication information from a terminal device, where the indication information is used to indicate that the uplink data belongs to a short message service; the determining module 903 is configured to determine identification information, where the identification information is used to identify a short message function entity device that processes the short message service; and the sending module 905 is configured to send the uplink data to the short message function entity based on the indication information and the identification information. For example, the receiving module 901 may be configured to perform any one of steps 202, 214, 220, and 228 in FIG. 2, steps 302, 314, and 324 in FIG. 3, steps 406, 418, 424, and 432 in FIG. 4, or steps 510 and 522 in FIG. 5; the determining module 903 may be configured to perform any one of steps 203, 204, 216, and 222 in FIG. 2, steps 304, 316, and 318 in FIG. 3, steps 408, 419, 421, 433, and 436 in FIG. 4, or steps 512, 523, and 526 in FIG. 5; and the sending module 905 may be configured to perform any one of steps 206, 218, 222, and 230 in FIG. 2, steps 306, 318, and 326 in FIG. 3, steps 410, 426, and 434 in FIG. 4, or steps 514 and 524 in FIG. 5.

In another embodiment, the receiving module 901 is configured to receive uplink data of a short message service and a session identifier from a terminal device, where the session identifier is used to identify a session for processing the short message service; the determining module 903 is configured to determine identification information associated with the session identifier, where the identification information is used to identify a short message function entity device that processes the short message service; and the sending module 905 is configured to send the uplink data to the short message function entity device based on the identification information associated with the session identifier. For example, the receiving module 901 may be configured to perform any one of steps 602, 614, 620, and 628 in FIG. 6, steps 706, 708, 720, 726, and 734 in FIG. 7, or steps 810, 812, and 824 in FIG. 8; the determining module 903 may be configured to perform any one of steps 603, 604, 616, and 622 in FIG. 6, steps 707, 710, 721, and 735 in FIG. 7, or steps 811, 814, and 826 in FIG. 8; and the sending module 905 may be configured to perform any one of steps 606, 618, 622, and 630 in FIG. 6, steps 706, 712, 723, 728, and 736 in FIG. 7, or steps 810, 816, and 828 in FIG. 8.

Figure 10A:
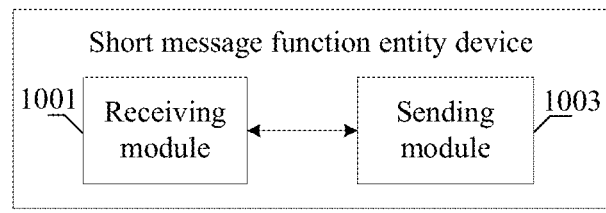
FIG. 10A and FIG. 10B are two schematic structural diagrams of a short message function entity device according to an embodiment of this application.

The short message function entity device may include a receiving module 1001 and a sending module 1003, as shown in FIG. 10A. For example, the short message function entity device may be implemented by the SMF device 108.

In an embodiment, the receiving module 1001 is configured to receive a first request message from a communications device; the sending module 1003 is configured to send, to a subscriber data management SDM device based on the first request message, a second request message including the identification information, where the identification information is used to identify the short message function entity device that processes the short message service; the receiving module 1001 is further configured to receive, from the SDM device, a second response message carrying subscription data of the short message service; and the sending module 1003 is further configured to send a first response message to the communications device, where the first response message indicates that the short message function entity device successfully registers the short message service. For example, the receiving module 1001 may be configured to perform any one of steps 206, 212, 222, and 225 in FIG. 2, steps 306, 312, 318, and 321 in FIG. 3, steps 410, 416, 422, and 430 in FIG. 4, or steps 514 and 520 in FIG. 5; and the sending module 1003 may be configured to perform any one of steps 208, 214, and 224 in FIG. 2, steps 308, 314, and 320 in FIG. 3, steps 412, 418, 424, and 432 in FIG. 4, or steps 516 and 522 in FIG. 5.

In another embodiment, the receiving module 1001 is configured to receive, from a communications device, a first request message that carries a DNN of a short message service and a session identifier, where the session identifier is used to identify a session for the short message service; the sending module 1003 is configured to send, to a subscriber data management SDM device based on the first request message, a second request message including the identification information, where the identification information is used to identify the short message function entity device that processes the short message service; the receiving module 1001 is further configured to receive, from the SDM device, a second response message carrying subscription data of the short message service; and the sending module 1003 is further configured to send a first response message to the communications device, where the first response message indicates that the short message function entity device successfully registers the short message service. For example, the receiving module 1001 may be configured to perform any one of steps 606, 612, 622, and 625 in FIG. 6, steps 712, 718, 724, and 732 in FIG. 7, or steps 816 and 822 in FIG. 8; and the sending module 1003 may be configured to perform any one of steps 608, 614, and 624 in FIG. 6, steps 714, 720, 726, and 734 in FIG. 7, or steps 818 and 824 in FIG. 8.

Figure 11A:
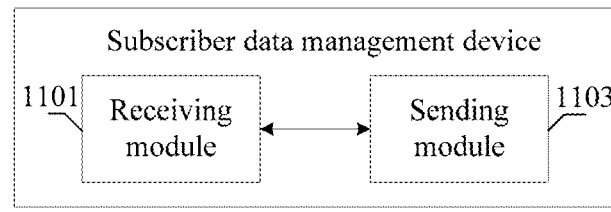
FIG. 11A and FIG. 11B are two schematic structural diagrams of a subscriber data management device according to an embodiment of this application.

The subscriber data management device may include a receiving module 1101 and a sending module 1103, as shown in FIG. 11A. For example, the subscriber data management device may be implemented by the SDM device 110.

In an embodiment, the receiving module 1101 is configured to receive a route lookup request message from a short message center, to query identification information, where the identification information is used to identify a short message function entity device that processes a short message service; if the SDM device does not have the identification information, the sending module 1103 is configured to send a notification message to a communications device, where the notification message includes a cause value: a mobile terminated short message service MT-SMS, and the cause value is used to trigger the communications device to send a first request message to the short message function entity device; the receiving module 1101 is further configured to receive, from the short message function entity device, a second request message including the identification information; and the sending module 1103 is further configured to send, to the short message function entity device, a second response message carrying subscription data of the short message service. For example, the receiving module 1101 may be configured to perform any one of step 208 in FIG. 2, step 308 in FIG. 3, steps 402 and 412 in FIG. 4, or steps 502, 506, and 516 in FIG. 5; and the sending module 1103 may be configured to perform any one of step 212 in FIG. 2, step 312 in FIG. 3, steps 406, 416, 420, and 428 in FIG. 4, or steps 510 and 520 in FIG. 5. In addition, the subscriber data management device may further include a registration module, configured to perform any one of step 210 in FIG. 2, step 310 in FIG. 3, step 414 in FIG. 4, or step 518 in FIG. 5; the subscriber data management device may further include a judgment module, configured to perform step 404 in FIG. 4 or step 504 in FIG. 5; and the subscriber data management device may further include a cache module, configured to perform step 508 in FIG. 5.

In another embodiment, the receiving module 1101 is configured to receive a route lookup request message from a short message center, to query identification information, where the identification information is used to identify a short message function entity device that processes a short message service; if the SDM device does not have the identification information, the sending module 1103 is configured to send a session request message to a communications device, where the session request message carries a DNN of the short message service, and the session request message is used to trigger establishment of a session for the short message service; the receiving module 1101 is further configured to receive, from the short message function entity device, a second request message including the identification information; and the sending module 1103 is further configured to send, to the short message function entity device, a second response message carrying subscription data of the short message service. For example, the receiving module 1101 may be configured to perform any one of step 608 in FIG. 6, steps 702 and 714 in FIG. 7, or steps 802, 806, and 818 in FIG. 8; and the sending module 1103 may be configured to perform any one of step 612 in FIG. 6, steps 706, 718, 722, and 730 in FIG. 7, or steps 810 and 822 in FIG. 8. In addition, the subscriber data management device may further include a registration module, configured to perform any one of step 610 in FIG. 6, step 716 in FIG. 7, or step 820 in FIG. 8; the subscriber data management device may further include a judgment module, configured to perform step 704 in FIG. 7 or step 804 in FIG. 8; and the subscriber data management device may further include a cache module, configured to perform step 808 in FIG. 8.

Figure 12A:
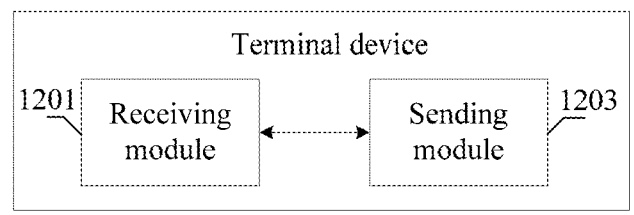
FIG. 12A and FIG. 12B are two schematic structural diagrams of a terminal device according to an embodiment of this application.

The terminal device may include a sending module 1201, as shown in FIG. 12A. For example, the terminal device may be implemented by the terminal device 102. The sending module 1201 is configured to send uplink data and indication information to a communications device, where the indication information is used to indicate that the uplink data belongs to a short message service. Alternatively, the sending module 1201 is configured to send uplink data and a session identifier to a communications device, where the session identifier is used to identify a session for processing a short message service. For example, the sending module 1201 may be configured to perform any one of steps 202 and 220 in FIG. 2, step 302 in FIG. 3, or steps 602 and 620 in FIG. 6. In addition, the terminal device may further include a receiving module that may be configured to perform any one of steps 419 and 433 in FIG. 4, step 523 in FIG. 5, or steps 707, 723, 728, and 736 in FIG. 7.

Figure 9B:
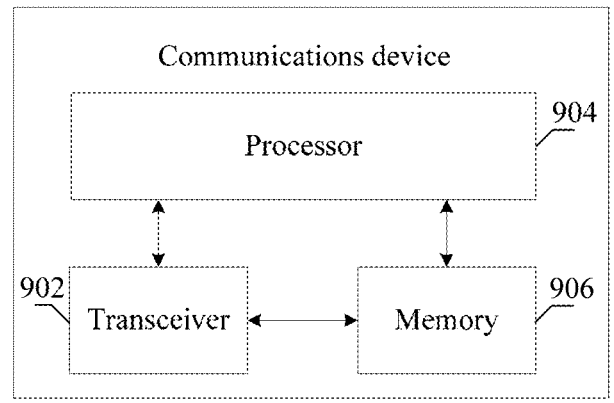

FIG. 9B is another possible schematic structural diagram of the communications device in the foregoing embodiments. As shown in FIG. 9B, the communications device includes a transceiver 902 and a processor 904. For example, the communications device may be implemented by the AMF device 106. The processor 904 is configured to support the communications device in performing the corresponding functions in the foregoing method. The transceiver 902 is configured to implement communication between the communications device and the foregoing terminal device/short message function entity device/subscriber data management device. The communications device may further include a memory 906, where the memory is configured to be coupled to the processor, and the memory stores a program instruction and data that are necessary for the communications device.

Figure 10B:
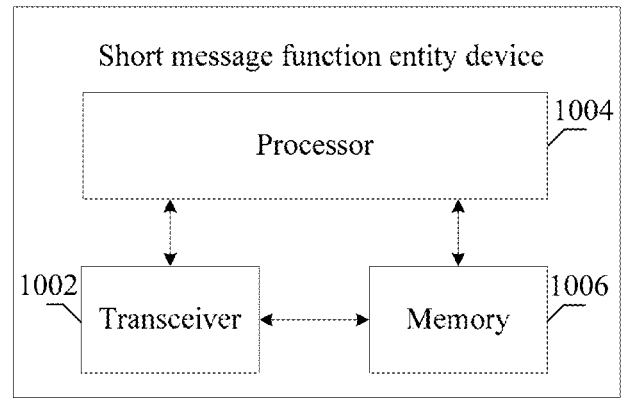

FIG. 10B is another possible schematic structural diagram of the short message function entity device in the foregoing embodiments. As shown in FIG. 10B, the communications device may include a transceiver 1002 and a processor 1004. For example, the short message function entity device may be implemented by the SMF device 108. The processor 1004 is configured to support the short message function entity device in performing the corresponding functions in the foregoing method. The transceiver 1002 is configured to implement communication between the short message function entity device and the foregoing communications device/subscriber data management device/short message center. The short message function entity device may further include a memory 1006, where the memory is configured to be coupled to the processor, and the memory stores a program instruction and data that are necessary for the short message function entity device.

Figure 11B:
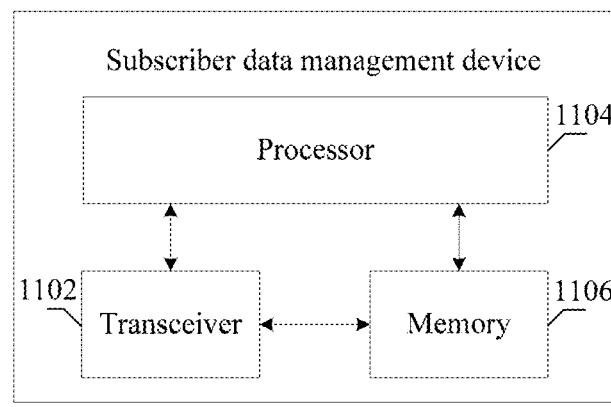

FIG. 11B is another possible schematic structural diagram of the subscriber data management device in the foregoing embodiments. As shown in FIG. 11B, the communications device may include a transceiver 1102 and a processor 1104. For example, the subscriber data management device may be implemented by the SDM device 110. The processor 1104 is configured to support the subscriber data management device in performing the corresponding functions in the foregoing method. The transceiver 1102 is configured to implement communication between the subscriber data management device and the foregoing communications device/short message function entity device/short message center. The subscriber data management device may further include a memory 1106, where the memory is configured to be coupled to the processor, and the memory stores a program instruction and data that are necessary for the subscriber data management device.

It may be understood that FIG. 9B, FIG. 10B, and FIG. 11B merely show simplified designs of the foregoing devices. During actual application, each of the foregoing devices may include any quantity of transmitters, receivers, processors, controllers, memories, communications units, or the like, and all the devices that can implement this application fall within the protection scope of this application.

Figure 12B:
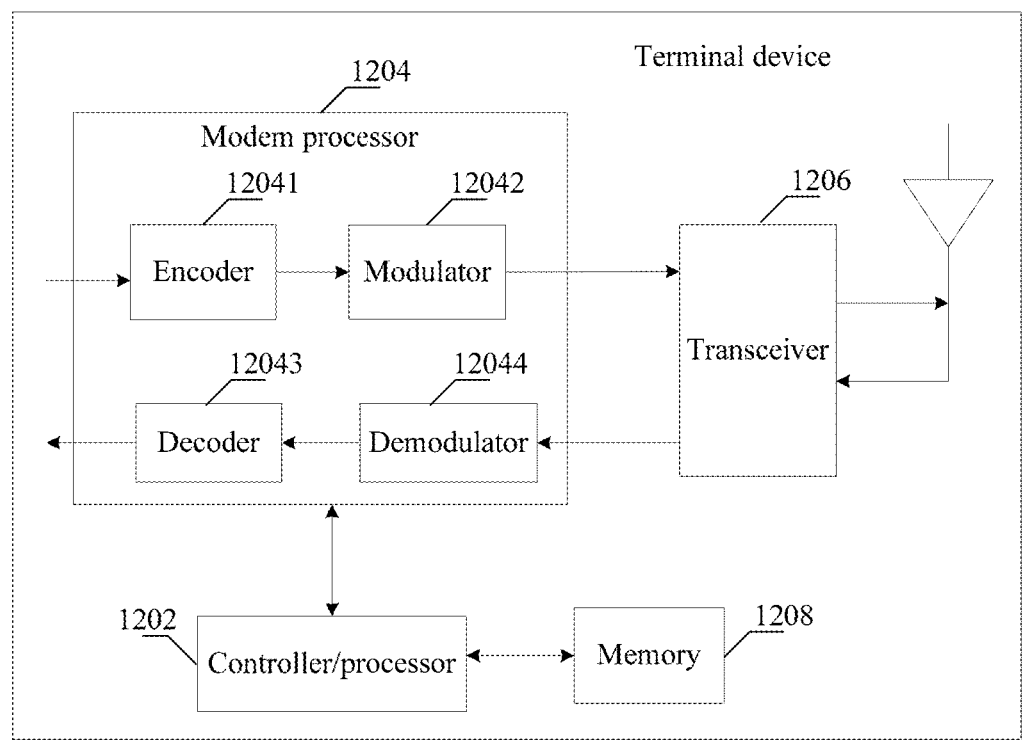

FIG. 12B is a simplified schematic diagram of another possible design structure of a terminal device in the foregoing embodiments. The terminal device may be the terminal device 102 in FIG. 1. The terminal device includes a transceiver 1206 and a controller/processor 1202, and may further include a memory 1208 and a modem processor 1204. The transceiver 1206 adjusts (for example, performs analog conversion, filtering, amplification, or up-conversion on) the output sampling and generates an uplink signal, and the uplink signal is transmitted to the base station in the foregoing embodiments by using an antenna. On a downlink, the antenna receives a downlink signal transmitted by the base station in the foregoing embodiments. The transceiver 1206 adjusts (for example, performs filtering, amplification, down-conversion, or digitization on) a signal received from the antenna, and provides an input sample. In the modem processor 1204, an encoder 12041 receives service data and a signaling message that are to be sent on an uplink, and processes (for example, performs formatting, encoding, or interleaving on) the service data and the signaling message. A modulator 12042 further processes (for example, performs symbol mapping or modulation on) encoded service data and an encoded signaling message, and provides an output sample. A demodulator 12044 processes (for example, demodulates) the input sample and provides a symbol estimate. A decoder 12043 processes (for example, performs de-interleaving or decoding on) the symbol estimate, and provides decoded data and a decoded signaling message that are sent to the terminal device. The encoder 12041, the modulator 12042, the demodulator 12044, and the decoder 12043 may be implemented by the integrated modem processor 1204. These units perform processing according to radio access technologies (for example, access technologies of an LTE system and another evolved system) used by a radio access network. The controller/processor 1202 performs control and management on actions of the terminal device, and is configured to perform the processing performed by the terminal device in the foregoing embodiments. For example, the controller/processor 1202 controls the terminal device to send, by using the transceiver 1206, uplink data and indication information to a communications device, where the indication information is used to indicate that the uplink data belongs to a short message service; or send, by using the transceiver 1206, uplink data and a session identifier to a communications device, where the session identifier is used to identify a session for processing a short message service. For example, the transceiver 1206 may be configured to perform any one of steps 202 and 220 in FIG. 2, step 302 in FIG. 3, steps 419 and 433 in FIG. 4, step 523 in FIG. 5, steps 602 and 620 in FIG. 6, or steps 707, 723, 728, and 736 in FIG. 7.

The controller/processor configured to perform functions of the foregoing communications device, short message function entity device, subscriber data management device, and terminal device may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logic blocks, modules, and circuits described with reference to the contents disclosed in this application. Alternatively, the processor may be a combination of processors implementing a computing function, for example, a combination of one or more microprocessors, or a combination of the DSP and a microprocessor.

Method or algorithm steps described in combination with the contents disclosed in this application may be implemented by hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partly generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

In the foregoing specific embodiments, the objectives, technical solutions, and benefits of this application are further described in detail. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A short message transmission method, comprising:
   receiving, by a communications device, uplink data and indication information from a terminal device, wherein the indication information is used to indicate that the uplink data belongs to a short message service;
   determining, by the communications device, identification information, wherein the identification information is used to identify a short message function entity device that processes the short message service;
   sending, by the communications device, the uplink data to the short message function entity based on the indication information and the identification information;
   sending, by the communications device, a first request message to the short message function entity device; and
   receiving, by the communications device, a first response message from the short message function entity device, wherein the first response message is configured to indicate that the short message function entity device successfully registers the short message service; and, wherein determining, by the communications device, the identification information comprises:
   obtaining, by the communications device, an association between the identification information and the terminal device; and before sending, by the communications device, the first request message to the short message function entity device, the method further comprises:
   receiving, by the communications device, a notification message from a subscriber data management SDM device, wherein the notification message carries a cause value: a mobile terminated short message service (MT-SMS), and the cause value is used to trigger the communications device to send the first request message.

2. The method according to claim 1, wherein before sending, by the communications device, the first request message to the short message function entity device, the method further comprises:
   receiving, by the communications device, an attach request message from the terminal device, wherein the attach request message carries capability information, and the capability information is configured to trigger the communications device to send the first request message.

3. The method according to claim 1, wherein before sending, by the communications device, the first request message to the short message function entity device, the method further comprises:

after receiving the uplink data from the terminal device, determining, by the communications device, that the communications device does not have the identification information.

4. The method according to claim 1, wherein the first request message carries a MT-SMS indication.

5. The method according to claim 1, wherein the first response message further carries downlink short message data.

6. The method according to claim 1, wherein determining, by the communications device, the identification information comprises:
sending, by the communications device, a second request message to a network function discovery device, wherein the second request message carries a type of a requested network function: a short message function; and
receiving, by the communications device, a second response message from the network function discovery device, to obtain the identification information, wherein the second response message carries the identification information.

7. The method according to claim 1, wherein determining, by the communications device, the identification information comprises:
searching for, by the communications device, a context of the terminal device to obtain the identification information associated with the terminal device, wherein the context comprises the association between the terminal device and the identification information.

8. A communications apparatus, comprising:
a receiver, configured to receive uplink data and indication information from a terminal device, wherein the indication information is used to indicate that the uplink data belongs to a short message service;
a processor, configured to determine identification information, wherein the identification information is configured to identify a short message function entity device that processes the short message service; and
a transmitter, configured to:
send the uplink data to the short message function entity based on the indication information and the identification information;
send a first request message to the short message function entity device;

send a request message to a network function discovery device, wherein the request message carries a type of a requested network function: a short message function; and
the receiver is further configured to:
receive a first response message from the short message function entity device, wherein the first response message is configured to indicate that the short message function entity device successfully registers the short message service; and
receive a response message from the network function discovery device, to obtain the identification information, wherein the response message carries the identification information; and
the processor is further configured to obtain an association between the identification information and the terminal device.

9. The communications apparatus according to claim 8, wherein before the transmitter sends the first request message,
the receiver is further configured to receive an attach request message from the terminal device, wherein the attach request message carries capability information, and the capability information is used to trigger the communications apparatus to send the first request message; or
after the receiver receives the uplink data, the processor determines that an access and mobility management function (AMF) device does not have the identification information; or
the receiver is further configured to receive a notification message from a subscriber data management SDM device, wherein the notification message carries a cause value: a mobile terminated short message service (MT-SMS), and the cause value is used to trigger the communications apparatus to send the first request message.

10. The communications apparatus according to claim 8, wherein the processor is configured to search for a context of the terminal device to obtain the identification information associated with the terminal device, wherein the context comprises the association between the terminal device and the identification information.

* * * * *